US011632775B2

(12) United States Patent
Xue et al.

(10) Patent No.: US 11,632,775 B2
(45) Date of Patent: Apr. 18, 2023

(54) CONFIGURED GRANT USING POLYNOMIAL OVER GALOIS FIELD

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Rajat Prakash, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 90 days.

(21) Appl. No.: 17/377,205

(22) Filed: Jul. 15, 2021

(65) Prior Publication Data
US 2023/0026028 A1  Jan. 26, 2023

(51) Int. Cl.
*H04W 72/12* (2009.01)
*H04W 72/14* (2009.01)
*H04W 72/1268* (2023.01)

(52) U.S. Cl.
CPC ....... *H04W 72/1268* (2013.01); *H04W 72/14* (2013.01); *H04W 72/1289* (2013.01)

(58) Field of Classification Search
CPC ............. H04W 72/1268; H04W 72/14; H04W 72/1289
See application file for complete search history.

(56) References Cited

U.S. PATENT DOCUMENTS

| 2010/0070548 | A1* | 3/2010 | Gashkov | G06F 7/724 |
| | | | | 708/492 |
| 2018/0310267 | A1* | 10/2018 | Liu | H04W 56/001 |
| 2020/0205090 | A1* | 6/2020 | Loehr | H04W 52/365 |
| 2020/0322980 | A1* | 10/2020 | Fakoorian | H04L 1/189 |
| 2020/0351030 | A1* | 11/2020 | Deogun | H04L 1/1887 |
| 2020/0351031 | A1* | 11/2020 | Wu | H04L 1/1822 |
| 2021/0168762 | A1* | 6/2021 | Huang | H04W 72/0446 |
| 2022/0007337 | A1* | 1/2022 | Lee | H04W 80/02 |

FOREIGN PATENT DOCUMENTS

| GB | 2580129 A | * | 7/2020 | ............. H04L 1/08 |
| WO | WO-2018144433 A1 | * | 8/2018 | ........... H04L 1/1887 |

* cited by examiner

*Primary Examiner* — Dinh Nguyen
(74) *Attorney, Agent, or Firm* — Qualcomm /Norton Rose Fulbright US LLP; Dang M. Vo

(57) ABSTRACT

This disclosure provides systems, methods, and devices for wireless communication that support managing allocation of configured grant (CG) resources for uplink transmissions using a polynomial over Galois field in a wireless communication system. In particular, a user equipment (UE) may be configured (e.g., by a base station) to determine a resource to access, from a resource pool configured for each CG occasion of a CG configuration, based on a polynomial over Galois field configured for the UE. The polynomial over Galois field may include a parameter p, and the UE may be configured with a mapping that maps the absolute time (e.g., a slot index or a symbol index) of a GC occasion to an index between 0 and p-1 that is used as input to the polynomial The result of the polynomial is used to determine the resource to access by the UE at the CG occasion.

30 Claims, 14 Drawing Sheets

CONFIGURED GRANT USING POLYNOMIAL OVER GALOIS FIELD

BACKGROUND

Field

Aspects of the present disclosure relate generally to wireless communication systems, and more particularly, to polynomial-based configured grant resource allocation operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a user equipment (UE), a resource from a resource pool for transmitting an uplink transmission to a base station at a first configured grant (CG) occasion. In aspects, the UE determines the resource for transmitting the uplink transmission at the first CG occasion from the resource pool using a polynomial over Galois field specified, at least in part, by a dimension p and an input x, and the UE is configured with a mapping of a system time of the first CG occasion to a first input value to be used as the input x for the first CG occasion. The method also includes transmitting the uplink transmission to the base station at the first CG occasion using the resource from the resource pool determined by an output of the polynomial over Galois field using the first input value mapped to the system time of the first CG occasion.

In an additional aspect of the disclosure, a method of wireless communication includes transmitting, by a base station to a UE, configuration information for a CG occasion for transmitting an uplink transmission from the first UE to the base station. In aspects, the configuration information includes an indication of a polynomial over Galois field specified, at least in part, by a dimension p and an input x, the polynomial over Galois field is used by the first UE to determine a resource from a resource pool for transmitting the uplink transmission at the at least one CG occasion, and the UE is configured with a mapping of a system time of the CG occasion to an input value to be used as the input x for the CG occasion. The method also includes receiving, from the first UE, the uplink transmission at the CG occasion over the resource from the resource pool determined by the first UE based on an output of the polynomial over Galois field using the input value mapped to the system time of the CG occasion.

In an additional aspect of the disclosure, a UE includes at least one processor and a memory coupled to the at least one processor. The at least one processor stores processor-readable code that, when executed by the at least one processor, is configured to perform operations including determining a resource from a resource pool for transmitting an uplink transmission to a base station at a first CG occasion. In aspects, the UE determines the resource for transmitting the uplink transmission at the first CG occasion from the resource pool using a polynomial over Galois field specified, at least in part, by a dimension p and an input x, and the UE is configured with a mapping of a system time of the first CG occasion to a first input value to be used as the input x for the first CG occasion. The operations also include transmitting the uplink transmission to the base station at the first CG occasion using the resource from the resource pool determined by an output of the polynomial over Galois field using the first input value mapped to the system time of the first CG occasion.

In an additional aspect of the disclosure, a base station includes at least one processor and a memory coupled to the at least one processor. The at least one processor stores processor-readable code that, when executed by the at least one processor, is configured to perform operations including transmitting, by a base station to a UE, configuration information for a CG occasion for transmitting an uplink transmission from the first UE to the base station. In aspects, the configuration information includes an indication of a polynomial over Galois field specified, at least in part, by a dimension p and an input x, the polynomial over Galois field is used by the first UE to determine a resource from a resource pool for transmitting the uplink transmission at the at least one CG occasion, and the UE is configured with a mapping of a system time of the CG occasion to an input value to be used as the input x for the CG occasion. The operations also include receiving, from the first UE, the uplink transmission at the CG occasion over the resource from the resource pool determined by the first UE based on an output of the polynomial over Galois field using the input value mapped to the system time of the CG occasion.

In an additional aspect of the disclosure, a non-transitory computer-readable medium stores instructions that, when executed by a processor, cause the processor to perform operations. The operations include determining, by a UE, a resource from a resource pool for transmitting an uplink transmission to a base station at a first CG occasion. In aspects, the UE determines the resource for transmitting the uplink transmission at the first CG occasion from the resource pool using a polynomial over Galois field specified, at least in part, by a dimension p and an input x, and the UE is configured with a mapping of a system time of the first CG occasion to a first input value to be used as the input x for the first CG occasion. The operations also include transmitting the uplink transmission to the base station at the first CG occasion using the resource from the resource pool determined by an output of the polynomial over Galois field using the first input value mapped to the system time of the first CG occasion.

In an additional aspect of the disclosure, a non-transitory computer-readable medium stores instructions that, when executed by a processor, cause the processor to perform operations. The operations include transmitting, by a base station to a UE, configuration information for a CG occasion for transmitting an uplink transmission from the first UE to the base station. In aspects, the configuration information includes an indication of a polynomial over Galois field specified, at least in part, by a dimension p and an input x, the polynomial over Galois field is used by the first UE to determine a resource from a resource pool for transmitting the uplink transmission at the at least one CG occasion, and the UE is configured with a mapping of a system time of the CG occasion to an input value to be used as the input x for the CG occasion. The operations also include receiving, from the first UE, the uplink transmission at the CG occasion over the resource from the resource pool determined by the first UE based on an output of the polynomial over Galois field using the input value mapped to the system time of the CG occasion.

In an additional aspect of the disclosure, an apparatus includes means for determining, by a UE, a resource from a resource pool for transmitting an uplink transmission to a base station at a first CG occasion. In aspects, the UE determines the resource for transmitting the uplink transmission at the first CG occasion from the resource pool using a polynomial over Galois field specified, at least in part, by a dimension p and an input x, and the UE is configured with a mapping of a system time of the first CG occasion to a first input value to be used as the input x for the first CG occasion. The apparatus also includes means for transmitting the uplink transmission to the base station at the first CG occasion using the resource from the resource pool determined by an output of the polynomial over Galois field using the first input value mapped to the system time of the first CG occasion.

In an additional aspect of the disclosure, an apparatus includes means for transmitting, by a base station to a UE, configuration information for a CG occasion for transmitting an uplink transmission from the first UE to the base station. In aspects, the configuration information includes an indication of a polynomial over Galois field specified, at least in part, by a dimension p and an input x, the polynomial over Galois field is used by the first UE to determine a resource from a resource pool for transmitting the uplink transmission at the at least one CG occasion, and the UE is configured with a mapping of a system time of the CG occasion to an input value to be used as the input x for the CG occasion. The apparatus also includes means for receiving, from the first UE, the uplink transmission at the CG occasion over the resource from the resource pool determined by the first UE based on an output of the polynomial over Galois field using the input value mapped to the system time of the CG occasion.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
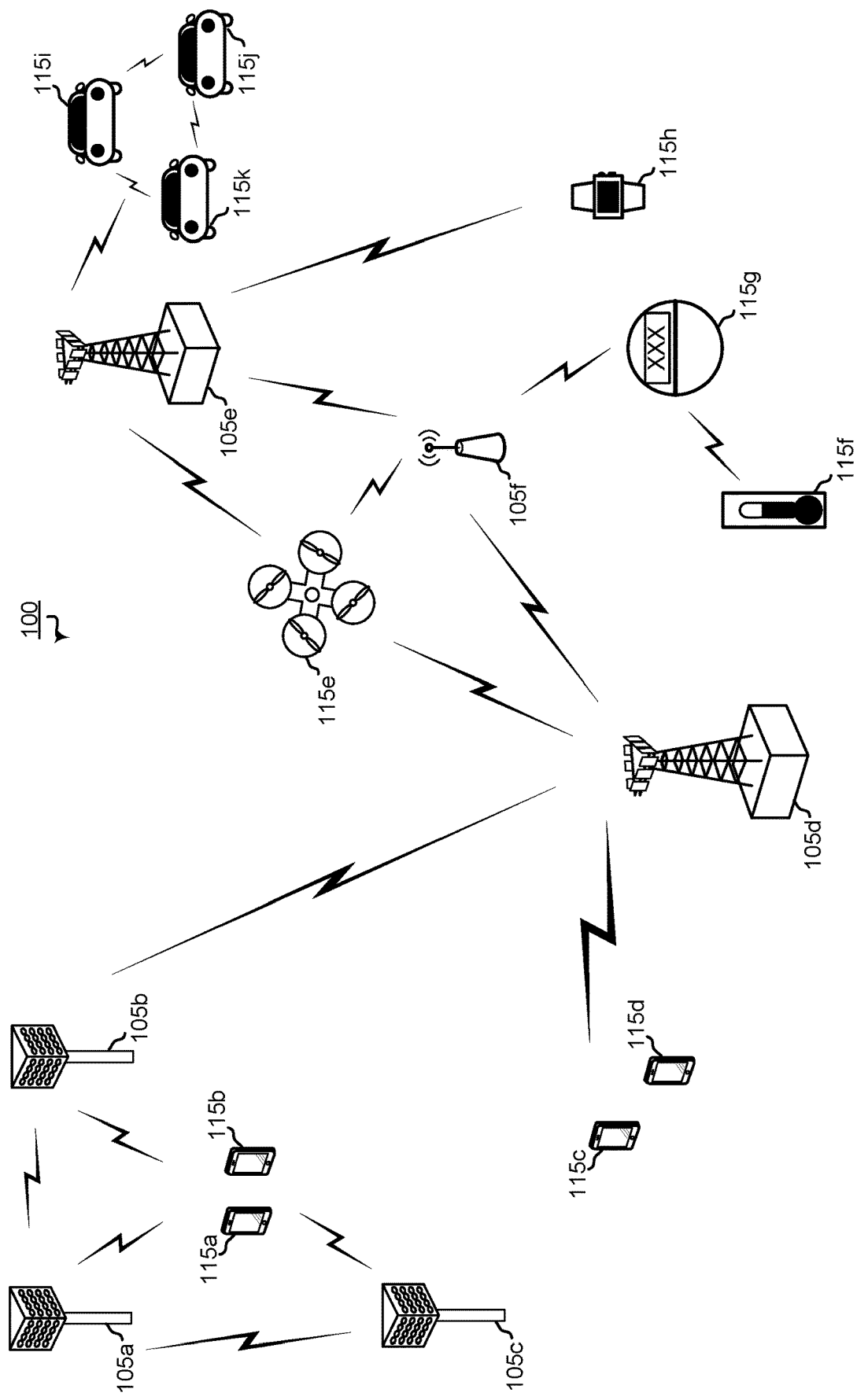
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports managing allocation of CG resources for uplink transmissions using a polynomial over Galois field in a wireless communication system in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
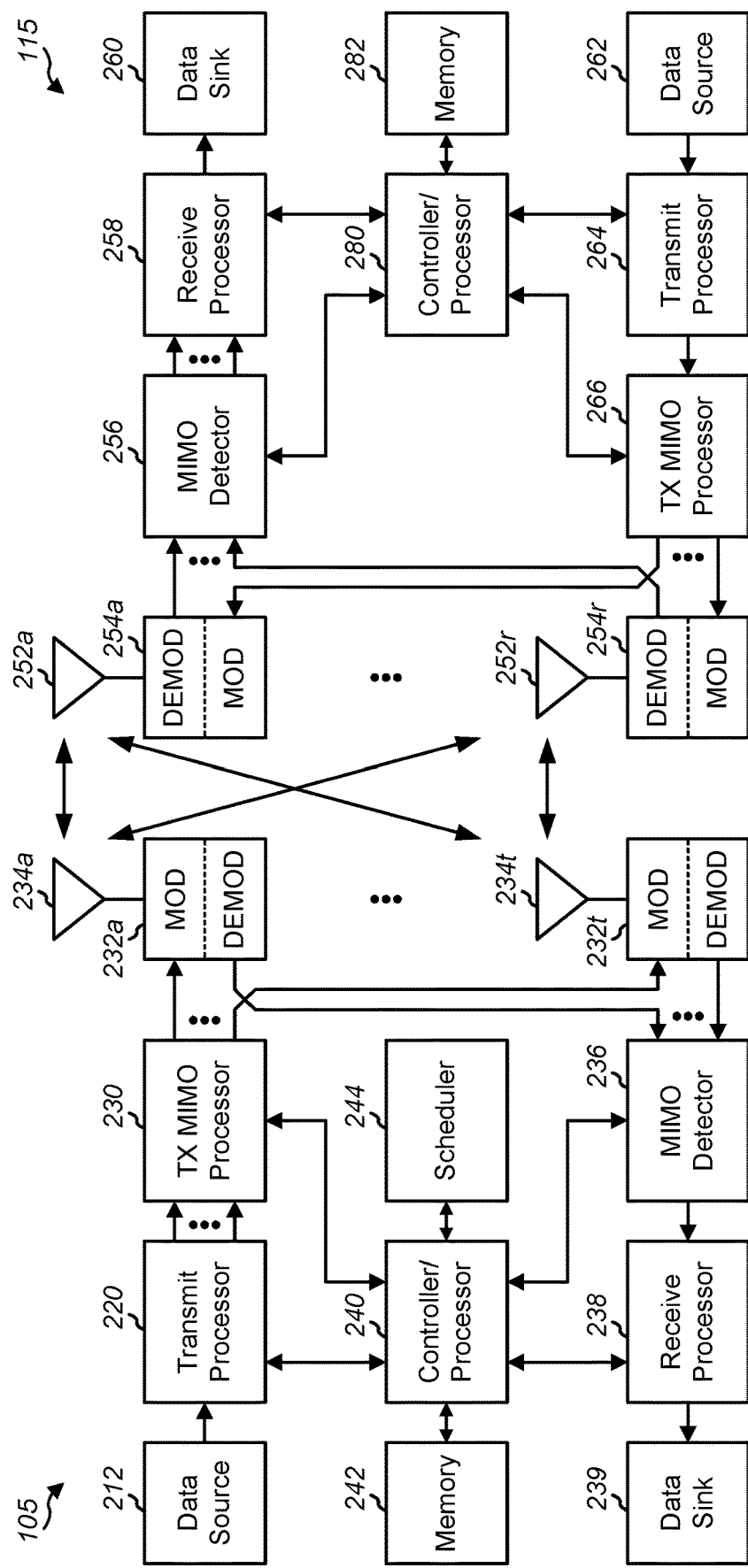
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 7 and 8 and/or other processes for the techniques described herein. The memories 242 and 282 may store data and program codes for the base station 105 and the UE 115, respectively. A scheduler 244 may schedule UEs for data transmission on the downlink and/or uplink.

In current implementations of wireless communication systems, support of premium devices (e.g., UEs using the eMBB protocol, such as smartphones, etc.) and other devices using protocols such as ultra-reliable low-latency communication (URLLC) and/or vehicle-to-everything (V2X) protocols, among others, has been given a high degree of importance. However, current proposed designs for wireless communication systems have begun to consider support for use cases other than premium services. For example, reduced capabilities (RedCap) UEs, also known as NR-light UEs, may include devices that have or are configured with limited capabilities when compared with a normal UE. These RedCap UEs may include wearable devices (e.g. smart watches, etc.), industrial wireless sensor networks (IWSN), surveillance cameras, IoT devices, sensors, etc., may be configured to operate in smaller supported bandwidth, have fewer antennas, etc., and may be optimized for operations in other than eMBB and URLLC operations. Compared to eMBB and URLLC operations, these other operations may have lower data rate, more relaxed latency, but may need to support a much denser number of users (e.g., may have to have massive capacity). There may be issues associated with massive capacity environments.

For example, in massive capacity operations, uplink (UL) control channel (e.g., physical downlink control channel (PDCCH)) transmissions may be a bottleneck, as control signals may have to be configured and transmitted to a large number of UEs. Various solutions have been proposed to address concerns on PDCCH bottlenecks, such as optimized semi-persistent scheduling (SPS) downlink and/or configured grant (CG) UL designs.

Currently, wireless communication system may have difficulties providing sufficient capacity for dynamic UL traffic with moderate latency requirement when implementing CG UL designs. For example, in some systems, latency requirements may be less than some latency (e.g., <10 ms, as required by some industrial wireless sensor use cases). In these implementations, radio resources may run out quickly because, unlike in systems using SPS DL, a base station may not have knowledge on UL traffic and therefore is not able to dynamically re-schedule CG UL resource for other purposes. In these cases, CG operations may be impacted negatively.

In some solutions, an adaptive CG UL for massive capacity design has been proposed. In this solution, a UE configured for CG may be configured with a resource pool at a CG occasion, and the resource pool may overlap with the resource pool of another UE with a CG configuration. In these cases, when a UE is allowed access to a CG occasion, the UE may access a portion of a resource in the resource pool using a hash function (e.g., a hash function configured by a base station, and using the UE's ID, time, etc., as inputs) of which the output may be an index into the resource pool. As will be appreciated, the hash-based solution may provide a mechanism for uniform and random resource selection that may provide reasonable performance on average with a relatively low loading level. However, random resource selection frequently leads to non-predictable performance to un-lucky UEs which may experience terrible collisions and even outages.

To address concerns with respect to the above described random hash function-based resource allocation, various approaches have been developed to facilitate reactive overloading control. In some cases, after observation of overloading, a base station may be configured to issue on-line adjustments to control whether a UE configured for CG operations may access a resource pool at a CG occasion and/or, when allowed, how to access the resource pool in a more proper way. However, these additional approaches offer no mechanism to proactively handle a collision (e.g., when two or more UEs may be configured to access a resource and/or resource pool at a concurrent time).

Various aspects of the present disclosure are directed to systems and methods that support managing allocation of CG resources for uplink transmissions using a polynomial over Galois field. In particular, in aspects of the present disclosure, a UE may be configured with a CG resource pool for each CG occasion of a CG configuration. The UE may be configured with a polynomial over Galois field (f(x)) that may be used to calculate and/or determine a resource of the CG resource pool associated with a CG occasion for the UE to access and/or use for a CG transmission during the associated CG occasion. In aspects, the polynomial over Galois field may include a parameter p, and the UE may be configured with a mapping that maps the absolute time (e.g., a slot index or a symbol index) associated with a GC occasion to an index between 0 and p−1. The mapped index may be used as an input to the polynomial over Galois field and the result may be used to determine the resource of the CG resource pool associated with the mapped CG occasion, which the UE may access and/or use to transmit an uplink transmission (e.g., a CG UL transmission) to a base station. In this manner, in a particular case, techniques disclosed in aspects of the present disclosure may be provide a mechanism to replace the hash-based random CG resource selection described above with a sequence of CG resource indices pre-optimized using a priori traffic related information so that collisions in the worst case may be better controlled.

Figure 3:
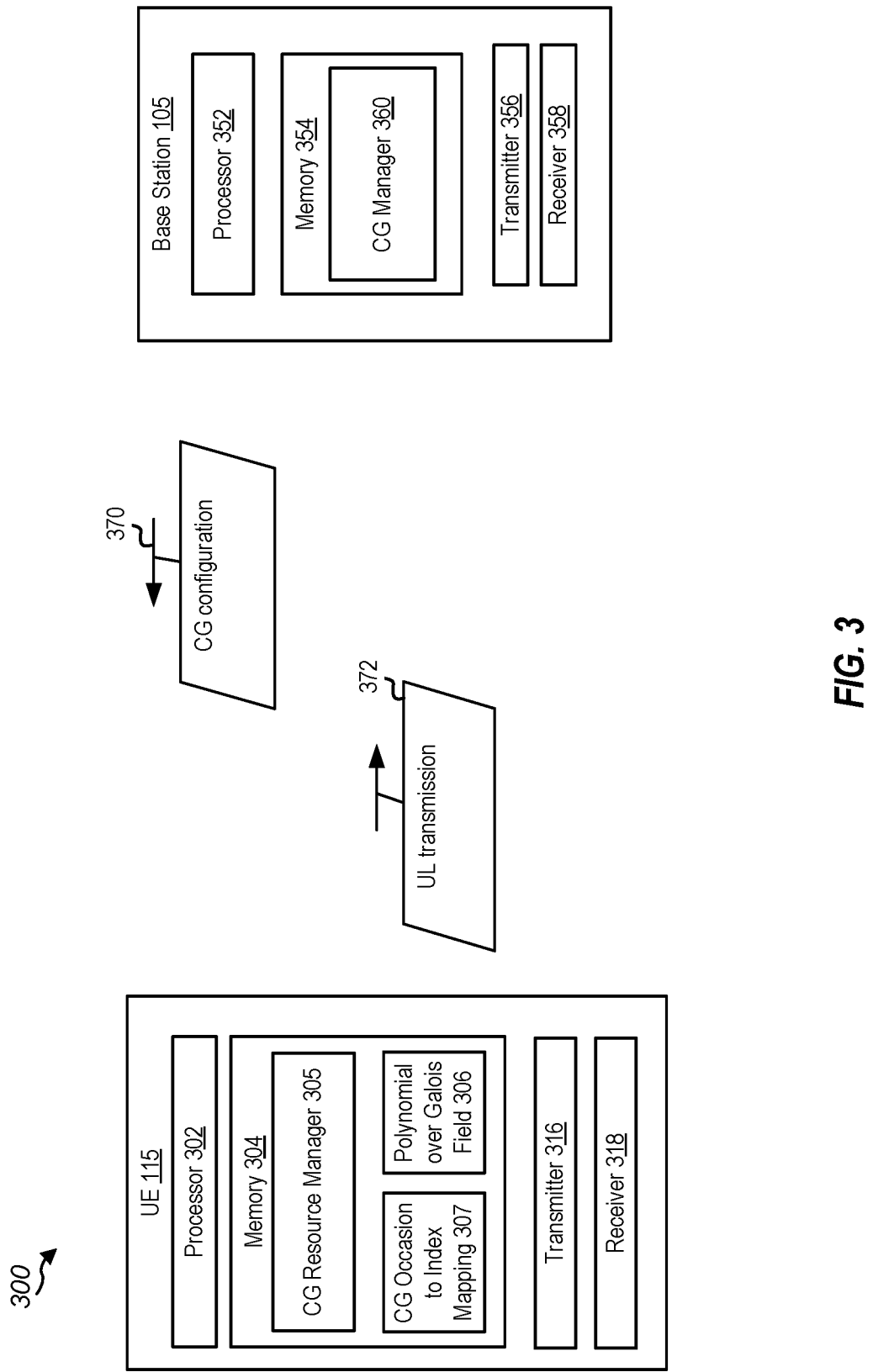
FIG. 3 is a block diagram of an example wireless communications system that supports managing allocation of CG resources for uplink transmissions using a polynomial over Galois field in a wireless communication system according to one or more aspects of the present disclosure.

FIG. 3 is a block diagram of an example wireless communications system 300 that supports managing allocation of CG resources for uplink transmissions using a polynomial over Galois field in a wireless communication system according to one or more aspects of the present disclosure. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115 and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store CG resource manager 305, polynomial over Galois field 306, and CG occasion to index mapping 307. In aspects, CG resource manager 305 is configured to perform operations for determining a resource of a CG resource pool associated with a CG occasion, based on the system time of the CG occasion and polynomial over Galois field 306, which UE 115 may access and/or use to transmit uplink transmission 372 to base station 105. In aspects, CG occasion to index mapping 307 may include a mapping of at least one CG occasion configured for UE 115 to an input index. In aspects, the input index may be used as an input to polynomial over Galois field 306 to calculate the resource from the CG resource pool of the CG occasion for transmitting uplink transmission 372 to base station 105.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store CG manager 360. CG manager 360 may be configured to perform operations for configuring UE 115 for CG operations. In aspects, CG manager 360 may provide CG configuration 370 to UE 115, including CG occasions to which UE 115 may have access, and/or specifying a CG resource pool associated with each CG occasion. In some aspects, CG configuration 370 may include CG occasion to index mapping 307 and may be provided to UE 115 by base station 105.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

Figure 4A:
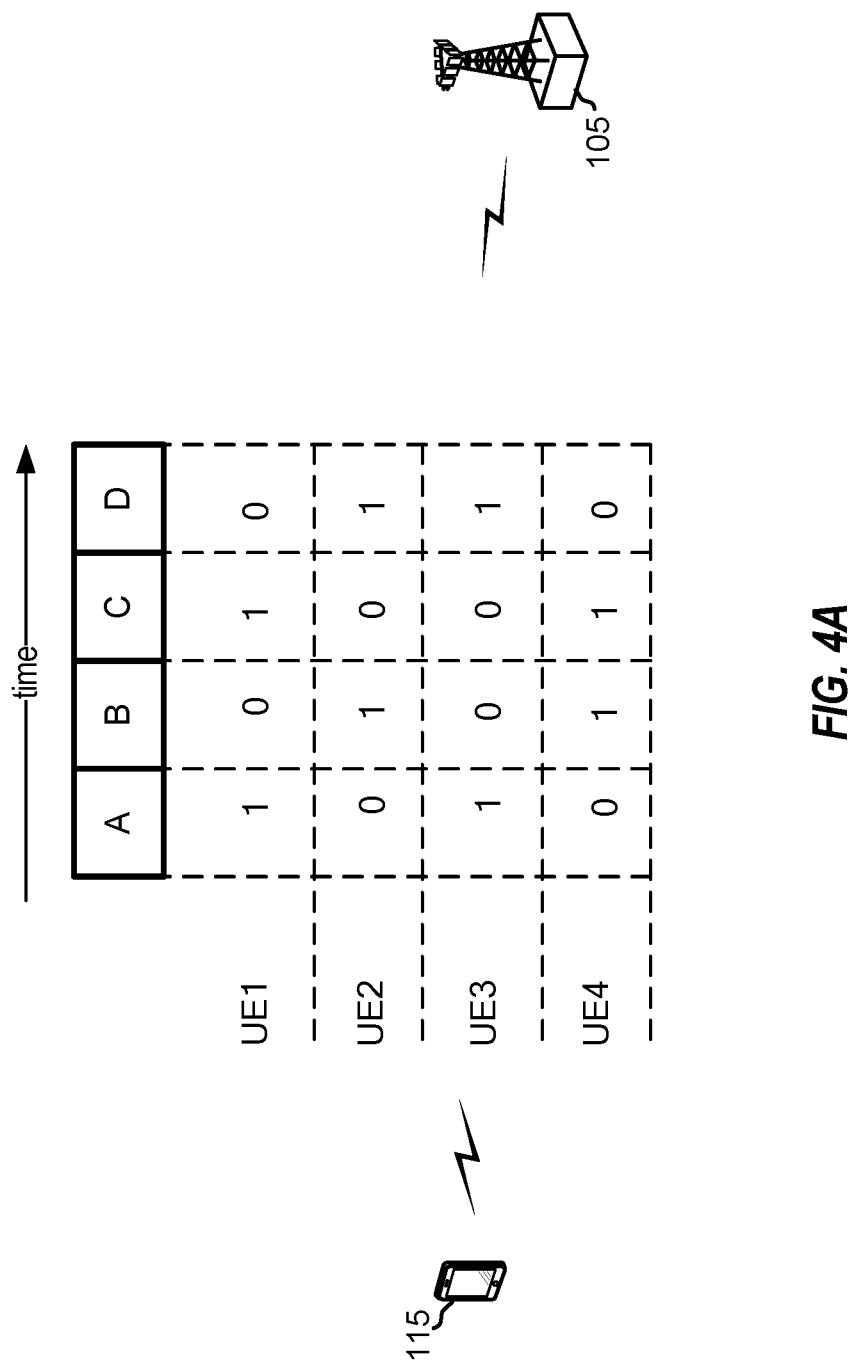
FIG. 4A is a block diagram illustrating an example of a collision control mechanism using a polynomial over Galois field.

It is noted that, using a pre-determined sequence to control collision in random access designs (e.g., using a polynomial over Galois field to define access to a resource in a resource pool) provides an effective means for controlling collisions. FIG. 4A is a block diagram illustrating an example of a collision control mechanism using a polynomial over Galois field. In particular, as shown, four UEs (e.g., UE1-UE4) may be contending for resources in a resource pool that includes four available slots (e.g., slots A-D) according to random traffic arrival. In aspects, each UE may be assigned a four-bit sequence with "1" indicating an access opportunity to a corresponding slot, and with a "0" indicating no access opportunity. For example, a "1010" sequence (e.g., the four-bit sequence with which UE1 is configured in the example illustrated in FIG. 4) may indicate an access opportunity for slots A and C (e.g., the second and fourth location starting from the leftmost bit), but no access opportunity for slots B and D. In aspects, the sequences for the four UEs may be generated using polynomials over Galois field. In this example, a condition is given that there may be at most two active UEs (no matter the set of indices, a.k.a. "topology transparent"). Under this condition, each active UE may be guaranteed to have at least one collision-free slot, as only two UEs may be active. For example, in the case where UE1 and UE 3 are active, UE1 may have slot C as an accessible collision-free slot, and UE 3 may have slot D as an accessible collision-free slot. Hence, in this case, the worst-case collision may be guaranteed.

In aspects, the polynomial over Galois field may be a polynomial (f(x)) of degree k mod p that may be expressed as in Equation 1 below.

$$f(x) = \sum_{i=0}^{k} a_i x^i (\bmod p) \quad \text{(Equation 1)}$$

where p is a prime number and $\alpha_i \in \{0, 1, \ldots, p-1\}$.

Figure 4B:
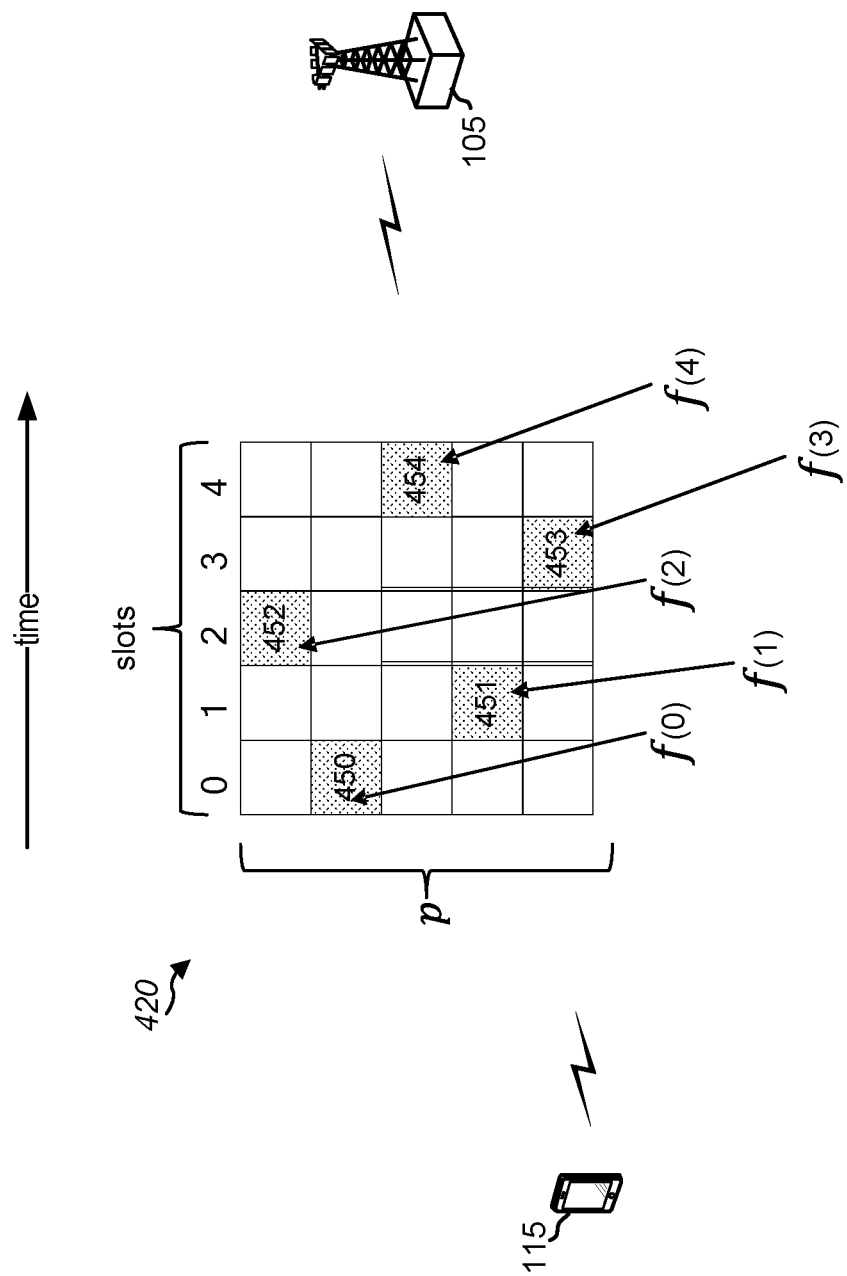
FIG. 4B is a block diagram illustrating an example of access resource based on a polynomial over Galois field.

Based on p, the above polynomial may be used to build a sequence of $\{f(0), f(1), \ldots, f(p-1)\}$, where f(i) E $\{0, 1, \ldots, p-1\}$. In this manner, the above polynomial may provide a result that may be interpreted as an index of one of p resources available at the i-th slot. FIG. 4B is a block diagram illustrating an example of access resource based on a polynomial over Galois field. In particular, UE 115 may be configured with a polynomial over Galois field f(x) for accessing resources (e.g., p resources) from resource pool 420 at each of slots 0-4. As explained above, a sequence of $\{f(0), f(1), \ldots, f(p-1)\}$ may be built. At each slot, the slot index may be used as input to the polynomial over Galois field f(x) to obtain an index of the resource within the resources p available at each slot that the UE may use to transmit to base station 105. For example, at slot index 0, f(0) may be calculated to obtain an index to resource 450 at slot 0. UE 115 may access resource 450 at slot 0 for transmitting uplink transmissions to base station 105. In this example, at slot indices 1-4, f(1)-f(4) may be calculated, respectively, to obtain indices to resources 451-454 at slots 1-4, respectively, for transmitting uplink transmissions to base station 105 at each respective slot.

In some aspects, there may be a total of $p^{k+1}$ polynomials over Galois field, which may limit the number of UEs that may be configured with CG configuration. In these aspects, it may be assumed that each UE may be assigned a unique polynomial over Galois field. As such, the values of p and/or k may increase proportionally to the number of UEs configured for CG operations, as the uplink transmissions from these UEs configured for CG operations may be multiplexed. It has been shown that k may determine the maximum number of collisions that an active UE may cause to another active neighbor UE. If an active UE has at most $D_{MAX}$ active neighbors, a value $p > k \cdot *D_{MAX}$ may be chosen in order to attempt to guarantee worse-case collisions. $D_{MAX}$ may be a design parameter that may be determined by the traffic profile of the system.

Figure 5A:
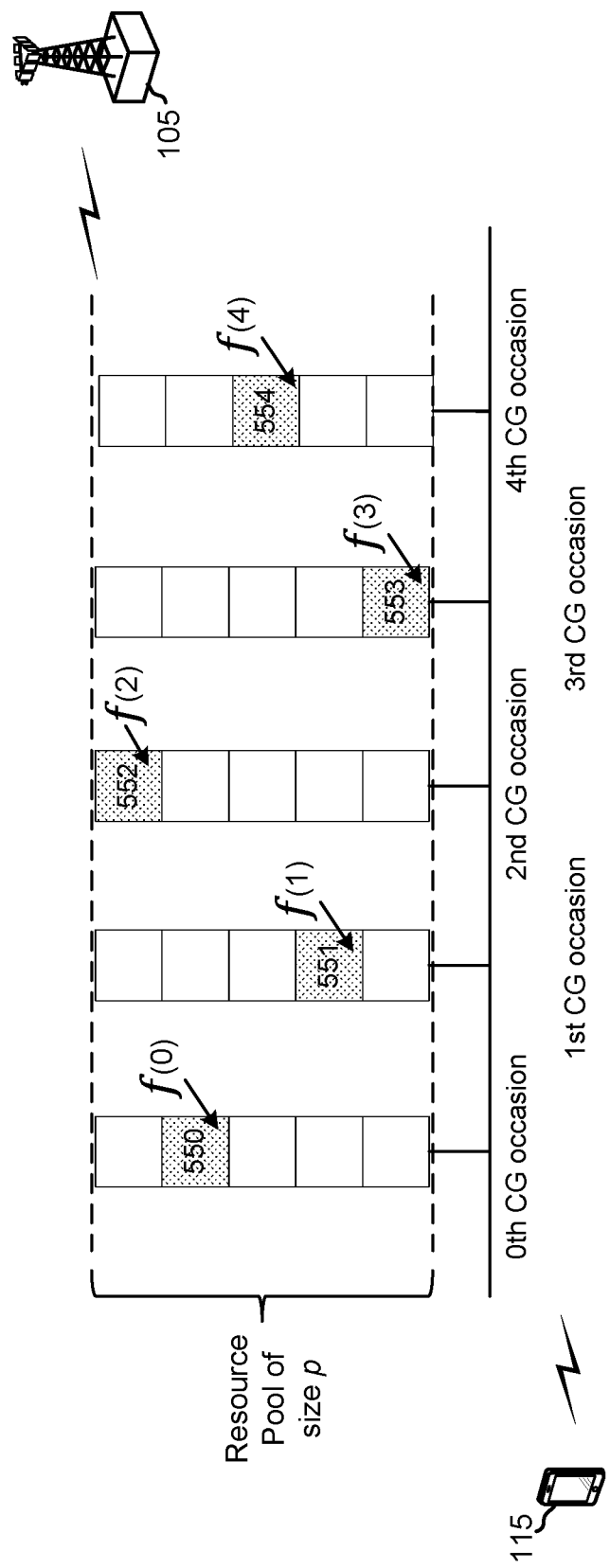
FIG. 5A is a diagram illustrating an example of a CG configuration for accessing resources based on a polynomial over Galois field in accordance with aspects of the present disclosure.

During operation of wireless communications system 300, base station 105 transmits CG configuration 370 to UE 115. CG configuration 370 may be transmitted from base station 105 to UE 115b via a downlink control information (DCI) message, an RRC (e.g., Type 1) message, and/or an RRC+DCI (e.g., Type 2) message. In aspects, CG configuration 370 may configure UE 115 for CG operations in which UE 115 may transmit uplink transmissions to base station 105 at specified CG occasions over specified CG resources. CG configuration 370 may specify periodic CG occasions in which UE 115 may transmit the uplink transmissions to base station 105. In aspects, the CG occasions may have a periodicity. For example, as shown in FIG. 5A, which is a diagram illustrating an example of a CG configuration for accessing resources based on a polynomial over Galois field in accordance with aspects of the present disclosure, UE 115 may be configured with 5 periodic CG occasions, and each CG occasion may be associated with a resource pool of size p resources. At each CG occasion, UE may access one or more of resources p, based on at least one polynomial over Galois field configured for UE 115 and based on the index of the respective CG occasion, for transmitting uplink transmissions to base station 105. In another example shown in FIG. 5B, which is a diagram illustrating another example of a CG configuration for accessing resources based on a polynomial over Galois field in accordance with aspects of the present disclosure, UE 115 may be configured with 3 periodic CG occasions, and each CG occasion may be associated with a resource pool of size p resources. In this example, at each CG occasion, UE may access one or more of resources p, based on at least one polynomial over Galois field configured for UE 115 and based on the index of the respective CG occasion, for transmitting uplink transmissions to base station 105. It is noted that in some aspects, the CG occasions and resources pools attached to each CG occasion may be determined using legacy mechanisms.

In some aspects, CG configuration 370 may include at least one polynomial over Galois field for UE to use when determining a resource from the CG resource pool at each CG occasion to access for uplink transmissions. In aspects, the at least one polynomial over Galois field may be specified, at least in part, by a dimension p and an input x. In some aspects, the at least one polynomial over Galois field may be stored by UE 115 and/or may be pre-configured. In some aspects, CG configuration 370 may include a mapping of the system time of each CG occasion (e.g., a slot index of the CG occasion and/or a symbol index of the CG occasion) to an input of the polynomial over Galois field with respect to each respective CG occasion. In this manner, the system time of each CG occasion may be mapped to a particular input to the polynomial over Galois field, which may provide a resource index for determining a resource to access at the respective CG occasion.

During operation of wireless communications system 300, UE 115 determines, at a CG occasion, a resource from a CG resource pool associated with the CG occasion for transmitting an uplink transmission to base station 105. In aspects, UE 115 may determine the resource at the CG occasion using the polynomial over Galois field. For example, as mentioned above, the polynomial over Galois field configured to UE 115 may take an input x, and as mentioned above, each CG occasion may be mapped (e.g., via the system time of the CG occasion) to an input of the polynomial over Galois field. At the CG occasion, the associated system time (e.g., slot index and/or symbol index) may be used to determine an input to the polynomial over Galois field, and the result of the polynomial over Galois field may be used to determine an index of the resource from the CG resource pool associated with the CG occasion to access for transmitting the uplink transmissions to base station 105. For example, with reference to FIG. 5A, UE 115 may be configured with five periodic CG occasions (e.g., CG occasions with index 0-4), and polynomial over Galois field f(x). In addition, each CG occasion may be associated with a CG resource pool of size of p resources. At the 0th CG occasion (e.g., the CG occasion with an index of "0"), UE 115 may determine a resource for transmitting uplink transmissions to base station 105 from the CG resource pool attached to the 0th CG occasion by obtaining and/or determining an input to the polynomial over Galois field f(x) for the 0th occasion. In aspects, UE 115 may determine the input to the polynomial over Galois field f(x) using the mapping configured to UE 115, which provides a mapping of the system time of the 0th CG occasion to the input to the polynomial over Galois field f(x). For example, the 0th CG occasion may map to an input of "0" (e.g., an index 0). In this case, using "0" as an input to the polynomial over Galois field f(x) (e.g., f(0)) may provide a result. In aspects, the result of executing, performing, and/or otherwise solving the polynomial over Galois field using the input "0" associated with the 0th CG occasion may be used (or may provide) an index to resource 550. In this case, at the 0th CG occasion, UE 115 may be configured to access resource 550 to transmit uplink transmissions to base station 105.

In this same example illustrated in FIG. 5A, at the 1st CG occasion, UE 115 may obtain an input to the polynomial over Galois field (e.g., a value of "1" from the mapping of the system time of the 1st CG occasion to the input), and may obtain an index to resource 551. As such, at the 1st CG occasion, UE 115 may be configured to access resource 551 to transmit uplink transmissions to base station 105. In a similar manner, at the 2nd-4th CG occasions, UE 115 may obtain respective inputs to the polynomial over Galois field (e.g., value of 2-4, respectively, from the mapping of the system time of the respective CG occasion to the input), and may obtain indices to resources 552-554, respectively. As such, at the 2nd-4th CG occasions, UE 115 may be configured to access resources 552-554, respectively, to transmit uplink transmissions to base station 105.

Figure 5B:
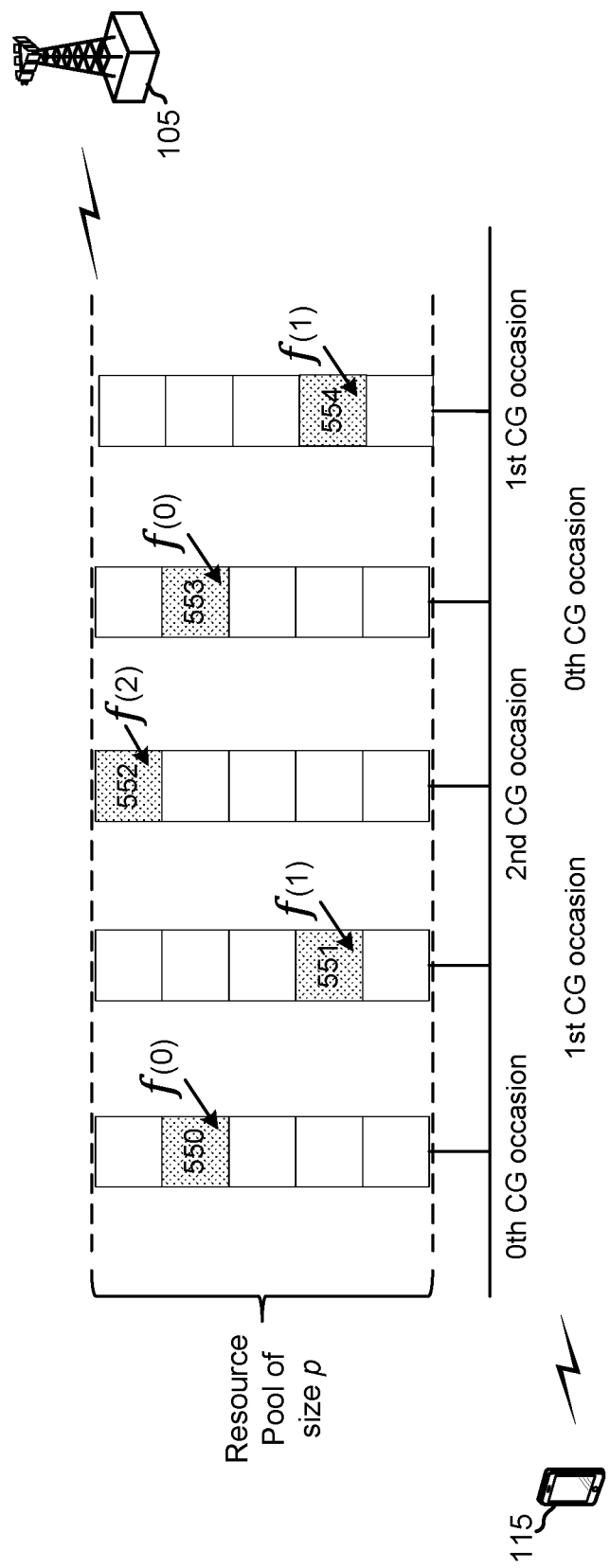
FIG. 5B is a diagram illustrating another example of a CG configuration for accessing resources based on a polynomial over Galois field in accordance with aspects of the present disclosure.

With reference to FIG. 5B, UE 115 may be configured with three periodic CG occasions (e.g., CG occasions with index 0-2) per period, and polynomial over Galois field f(x). In this example, each periodic CG occasion may be associated with a CG resource pool of size of p resources. At the 0th CG occasion, UE 115 may determine a resource for transmitting uplink transmissions to base station 105 from the CG resource pool attached to the 0th CG occasion using the polynomial over Galois field f(x) with an input equal to the value to which the system time of the 0th CG occasion is mapped. For example, the system time (e.g., the slot index or the symbol index) of the 0th occasion in this case may be mapped to an input value of "0." As such, in this example, UE 115 determines the resource for transmitting uplink transmissions to base station 105 at the 0th occasion using the polynomial over Galois field f(x) with an input value of "0." The result provides an index of the resource within the CG resource pool associated with the 0th occasion, which in this example is resource 550. In a similar manner, at the 1st and 2nd CG occasions, UE 115 may obtain respective inputs to the polynomial over Galois field (e.g., value of 1 and 2, respectively, from the mapping of the system time of the respective CG occasion to the input), and may obtain indices to resources 551 and 552, respectively. As such, at the 1st and 2nd CG occasions, UE 115 may be configured to access resources 551 and 552, respectively, to transmit uplink transmissions to base station 105. In aspects, the mapping of the CG occasion's system time to the input value may be for each period of the CG occasions. For example, the same input value for the polynomial over Galois field may be used for each 0th CG occasion in every CG occasion period, the same input value for the polynomial over Galois field may be used for each 1st CG occasion in every CG occasion period, and so on for every CG occasion index within each CG occasion period. In this manner, a sequence of resource indices for UE 115 to access may be built, in which each resource index corresponds to a CG occasion.

With reference back to FIG. 3, during operation of wireless communications system 300, UE 115 transmits uplink transmission 372 to base station 105 at a CG occasion over the resource determined for the CG occasion based on the polynomial over Galois field with an input value mapped from the system time of the CG occasion. For example, referring to FIG. 5B, at the 0th CG occasion, UE 115 may transmit to base station 105 over resource 550 (or resource 553 in the second CG occasion period), UE 115 may transmit to base station 105 over resource 551 at the 1st CG occasion, and/or UE 115 may transmit to base station 105 over resource 552 at the 2nd CG occasion.

In aspects, as the polynomial over Galois field with which UE 115 is configured in accordance with aspects of the present disclosure is defined over a Galois field, the number of all polynomials for a given p and k that may be defined may be limited. In these aspects, configuring UE 115 with the polynomial over Galois field may include defining a table of polynomials over Galois field, and specifying and/or providing an index into the table pointing to one (or more) of the polynomials in the table. In some aspects, the table of polynomials may be predefined and stored within UE 115, and/or may be configured by base station 105 (e.g., via CG configuration 370). In aspects, UE 115 may be provided with at least one index pointing to at least one of the polynomials in the table of polynomials. For example, a low-bit index may be provided to UE 115 via a Layer 1 (L1) control signal. In this manner, the polynomial used by UE 115 may be updated according to system needs. UE 115 may then use the polynomial(s) over Galois field to which the at least one index points to determine a resource to access at a CG occasion based on the polynomial(s) over Galois field in accordance with aspects of the present disclosure as described herein.

In some aspects, a CG occasion within a period (or within all periods) may be disabled by configuring UE 115 to map the system time of the CG occasion to an invalid input to the polynomial over Galois field. For example, an input value to a polynomial over Galois field may be considered invalid when the input value is any integer ≥p. This is because an input value p is invalid for a mod-p polynomial. In this manner, by configuring UE 115 such that the system time of a CG occasion maps to an integer ≥p as an input to the polynomial over Galois field, the CG occasion may be disabled. UE 115 may not transmit to base station 105 during a disabled CG occasion. In alternative or additional aspects, UE 115 may be configured to disable a CG occasion by configuring (or reconfiguring) the number of resource in the CG resource pool associated with the CG occasion to be smaller than p.

Figure 6A:
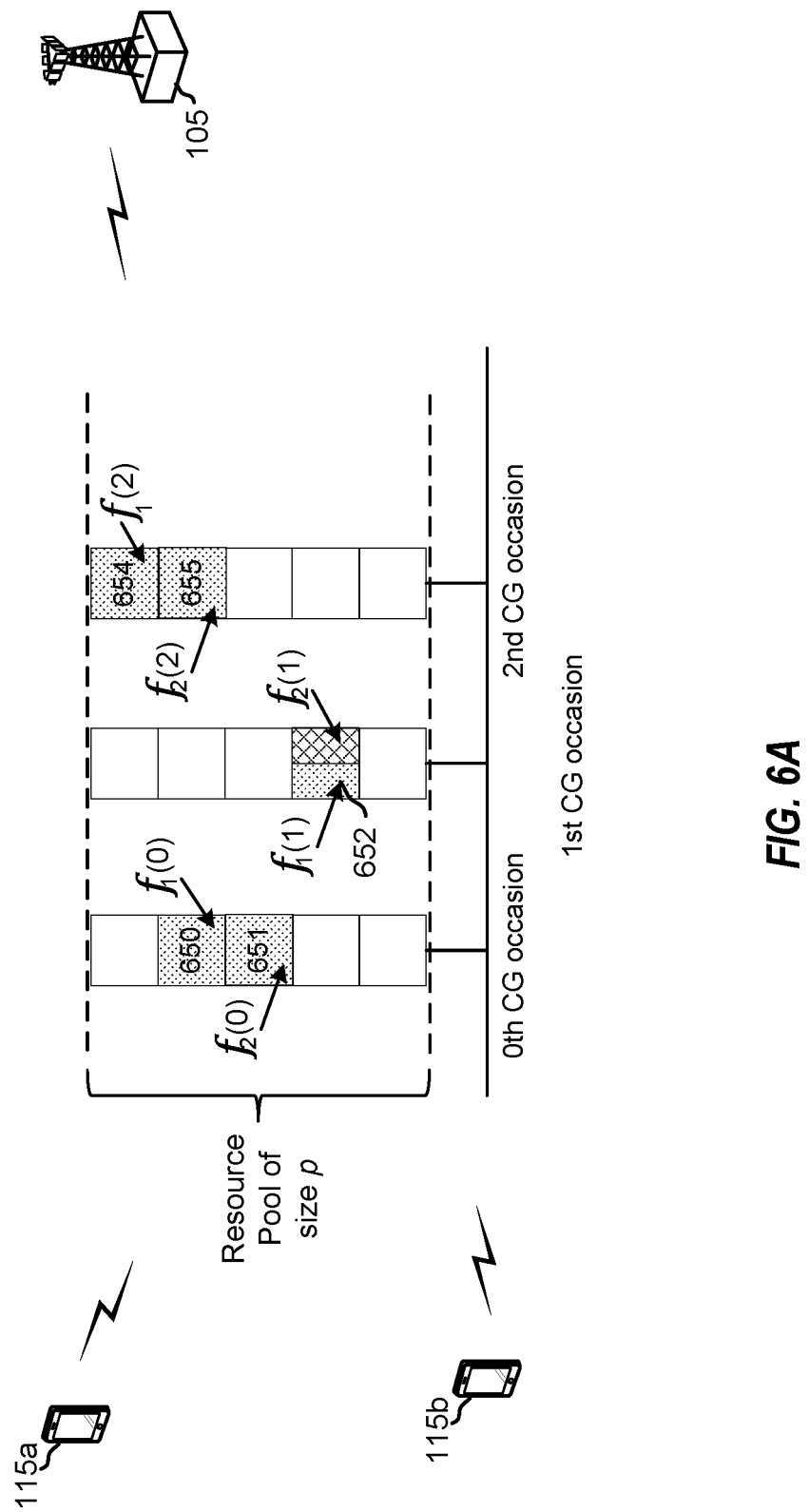
FIG. 6A is a block diagram illustrating an example of retransmission resource allocation for multiple UEs using polynomial-based resource allocation in accordance with aspects of the present disclosure.

In aspects, the polynomial-based resource allocation techniques disclosed herein (e.g., resource allocation using a polynomial over Galois field) may be used to allocate resources for retransmissions. For example, base station 105 may send control signals (e.g., via L1 signaling) to scheduled and/or configure retransmissions of multiple UEs, which may include UE 115, over a CG resource pool using polynomial-based resource allocation (e.g., resource allocation of a CG occasion resource pool using a polynomial over Galois field). Using the polynomial-based resource allocation to allocation retransmission resources may provide overhead savings over legacy dynamic grants. FIG. 6A is a block diagram illustrating an example of retransmission resource allocation for multiple UEs using polynomial-based resource allocation in accordance with aspects of the present disclosure. As shown, in aspects, base station 105 may define a retransmission CG resource pool for each of the three CG occasions with dimension p for UE 115a and UE 115b. In some aspects, some of the p resources in the CG resource pool may be defined "virtually," for example when none of the retransmitting UEs are assigned resources therein. UE 115a and UE 115b may be configured with respective polynomials over Galois field for determining a resources for transmitting (or retransmitting) to base station 105. For example, UE 115a may be configured with polynomial over Galois field $f_1(x)$, and UE 115b may be configured with polynomial over Galois field $f_2(x)$. In some aspects, the polynomial over Galois field for a particular UE may be assigned by base station 105 to the specific UE, such as via the L1 control signaling. In some aspects, a different polynomial over Galois field may be specified for each CG occasion.

In aspects, each of UE 115a and UE 115b may determine a resource for transmitting (or retransmitting) at each CG occasion based on the polynomial over Galois field using an input value x. In some aspects, base station 105 may specify an optimized input value x for the configured retransmission CG resource pool specified for UE 115 a and 115b. For example, as shown in FIG. 6A, the results of the polynomials over Galois field at the 0th occasion and the 2nd occasion provide resource indices for the respective UEs that are non-overlapping. For example, at the 0th CG occasion, the mapped input value for the polynomial over Galois field $f_1(0)$ for UE 115a results in allocation of resource 650 to UE 115a, and the mapped input value for the polynomial over Galois field $f_2(0)$ for UE 115b results in allocation of resource 651 to UE 115b. Resources 650 and 651 are non-overlapping. Similarly, at the 2nd CG occasion, the mapped input value for the polynomial over Galois field $f_1(2)$ for UE 115a results in allocation of resource 654 to UE 115a, and the mapped input value for the polynomial over Galois field $f_2(2)$ for UE 115b results in allocation of resource 655 to UE 115b, which is non-overlapping with resource 654. However, at the 1st CG occasion, the mapped input value for the polynomial over Galois field $f_1(1)$ for UE 115a results in allocation of resource 652 to UE 115a, and the mapped input value for the polynomial over Galois field $f_2(1)$ for UE 115b results in allocation of the same resource 652 to UE 115b. In this case, base station 105 may determine that input values "0" and "2" are better optimized for concurrent retransmissions from UE 115a and 115b to base station 105, as an input value of "1" may result in a collision. In this case, base station 105 may optimize the input value x for the CG occasions by specifying an input value x of "0" or "1" to UE 115a and 115b. In some aspects, UE 115a and UE 115b may use the specified input value x for each of the CG occasions, instead of the valued mapped from the system time of the CG occasion to an input value.

In aspects, a UE may be configured with more than one polynomial over Galois field for determining a resource within a CG resource pool at a CG occasion. For example, a UE (e.g., UE 115) may be configured with multiple polynomials over Galois field. In this case, UE 115 may, at a CG occasion, use any of the polynomials over Galois field, including using one or a combination of more than one, polynomials concurrently, for determining a resource within a CG resource pool to access for uplink transmissions. In some alternative or additional aspects, a first polynomial over Galois field may be designated as a primary polynomial. In this case, UE 115 may first use the primary polynomial over Galois field for determining a transmission resource at a CG occasion, and may use any of the other polynomials over Galois field, as needed.

Figure 6B:
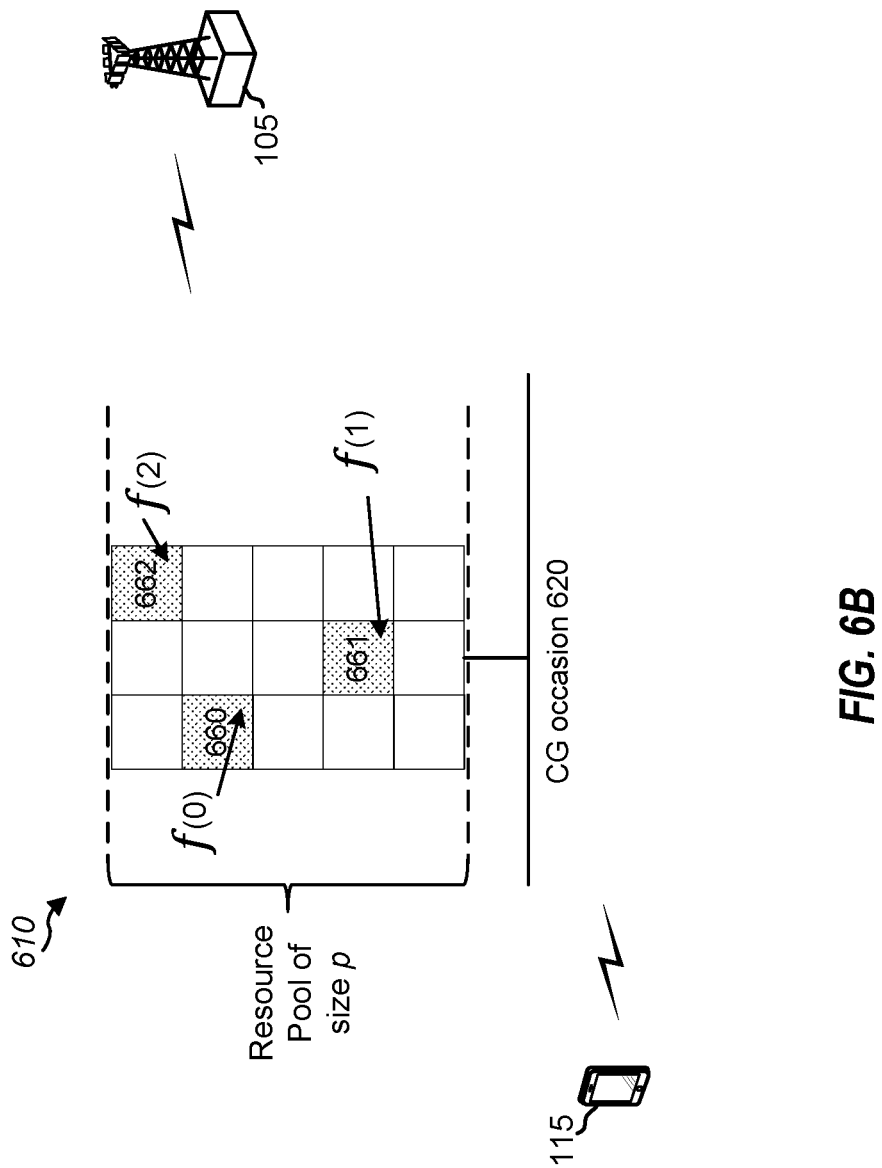
FIG. 6B is a diagram illustrating an example of multiple polynomials over Galois field used for resource allocation at a CG occasion in accordance with aspects of the present disclosure.

In aspects, UE 115 may be configured with a mapping from the system time of a CG occasion to more than one (e.g., m) inputs to the same polynomial over Galois field. For example, in some aspects, a CG resource pool at a CG occasion may include a plurality of sub-pools, with each sub-pool including p pieces of resources. FIG. 6B is a diagram illustrating an example of multiple polynomials over Galois field used for resource allocation at a CG occasion in accordance with aspects of the present disclosure. As shown, resource pool 610 may include p resources, and may be divided into m sub-pools, where each sub-pool includes p pieces of the p resources, such that each resource of the p resource of resource pool 610 may be made up of m pieces of resources. In this example, m=3. In aspects, UE 115 may be configured with a polynomial over Galois field, and a mapping from the system time of CG occasion 620 (e.g., slot index or symbol index) to m (e.g., m=3) input values to the polynomial over Galois field. In this case, using the three input values on the polynomial over Galois field results in three resource indices, which in the example illustrated in FIG. 6B point to resource pieces 660-662. In some aspect, each resource piece is a pieces in a different sub-pool of resource pool 610. UE 115 may use the identified resource pieces for transmitting uplink transmissions to base station 105.

Figure 6C:
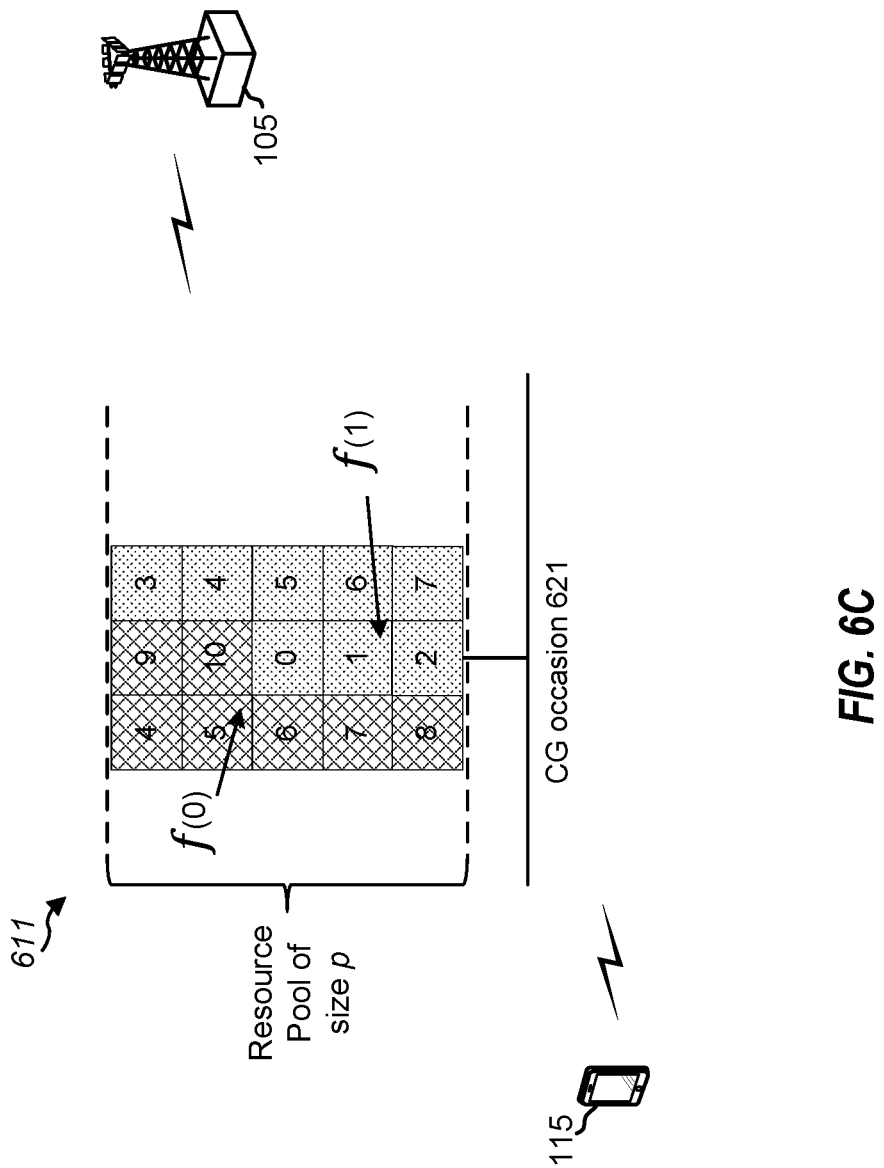
FIG. 6C is a diagram illustrating an example of cross-occasion sub-pooling for polynomial-based resource allocation in accordance with aspects of the present disclosure.

In some aspects, there may not be resources to define a multiple-prime-number resource pool at a CG occasion. In these aspects, UE 115 may be configured with cross-occasion sub-pool(s), which may include p resources, in order to provide resource access based on polynomials over Galois field in accordance with aspects of the present disclosure. FIG. 6C is a diagram illustrating an example of cross-occasion sub-pooling for polynomial-based resource allocation in accordance with aspects of the present disclosure. As shown, resource pool 611 may include p=15 resources, but the p may be split into two sub-pools (each with 11 resources). In this example, UE 115 may be configured to use an input value x=0 to the polynomial over Galois field to access the first sub-pool, and to use an input value x=1 to the polynomial over Galois field to access the second sub-pool. In some aspects, there may be more than one resource available at the resource pool, in which case the UE may select one of the resources. In one aspects, the UE may freely select a resource from the more than one available resource to access and to transmit uplink transmissions. In another aspect, UE 115 may be configured to select the first or the last resource available in the resources pool, and then to use the last resource (when UE 115 uses the first resource first) or the first resource (when UE 115 uses the last resource first) available in the resource pool.

In aspects, base station 105 may be aware of which resources within a CG resource pool at a CG occasion may be used by a UE (or by any UE), as the UEs access the CG resource pool based on an assigned polynomial over Galois field. As such, base station 105 may know which resources are not used by any UE within a CG resource pool at a CG occasion. In these cases, base station 105 may re-allocate the unused resources for other purposes. For example, base station 105 may re-allocate the unused resources for dynamic grants with orthogonal allocations.

In aspects, the polynomial based resource allocation described herein may be used in channel occupancy time (COT)-sharing environments. For example, a UE in sidelink operations with other UEs, may perform a listen-before-talk (LBT) procedure to determine that a communication channel is available, and may obtain a COT associated with the LBT operation. The UE may then decide to share the COT (or a portion of the COT) with another of the sidelink UEs, with a group of the other sidelink UEs (e.g., group-sharing), or with any nearby UE (e.g., public sharing). Upon another one of the sidelink UEs obtaining access to the COT, the other sidelink UE may perform during the COT. However, COT group-sharing and public sharing in particular suffer from problems with collisions. For example, when multiple sidelink UEs compete for the share COT, the multiple UEs may select the same set of sharing resources within the COT. This is especially true for FDM-based COT-sharing.

In aspects, using the resource allocation based on polynomials over Galois field described herein provides a mechanism for supporting COT-sharing and avoiding collisions. In particular, in aspects, each sidelink UE of a sharing group may obtain at least one polynomials over Galois field to be used for determining the sharing resources of the shared-COT to use. In aspects, a sidelink UE of the sharing group may obtain the polynomial or polynomials over Galois field when the sidelink UE joins the sharing group. The sidelink UE may then use the polynomial over Galois field to determine which resource to use, from within the shared-COT for transmitting during the COT. In aspects, the polynomials over Galois field provided to the UEs in the sharing group may be configured to ensure that no collisions occur during the COT-sharing.

In some aspects, the sharing UE (e.g., the UE that obtained the COT during the LBT procedure) may define in the sidelink control information provided to the other sidelink UEs in the sharing group, the resource pool and a corresponding input (e.g., an input corresponding to each particular sidelink UE) to the polynomial over Galois field provided to each sidelink UE. If a sidelink UE in the sharing group has traffic to transmit, the sidelink UE may access resources within the shared-COT, based on the corresponding polynomial over Galois field using the corresponding input, to transmit the traffic during the COT. It is noted that the description above with respect to CG operations, including any of the aspects described above, may also be applicable to COT-sharing operations as discussed herein.

Figure 7:
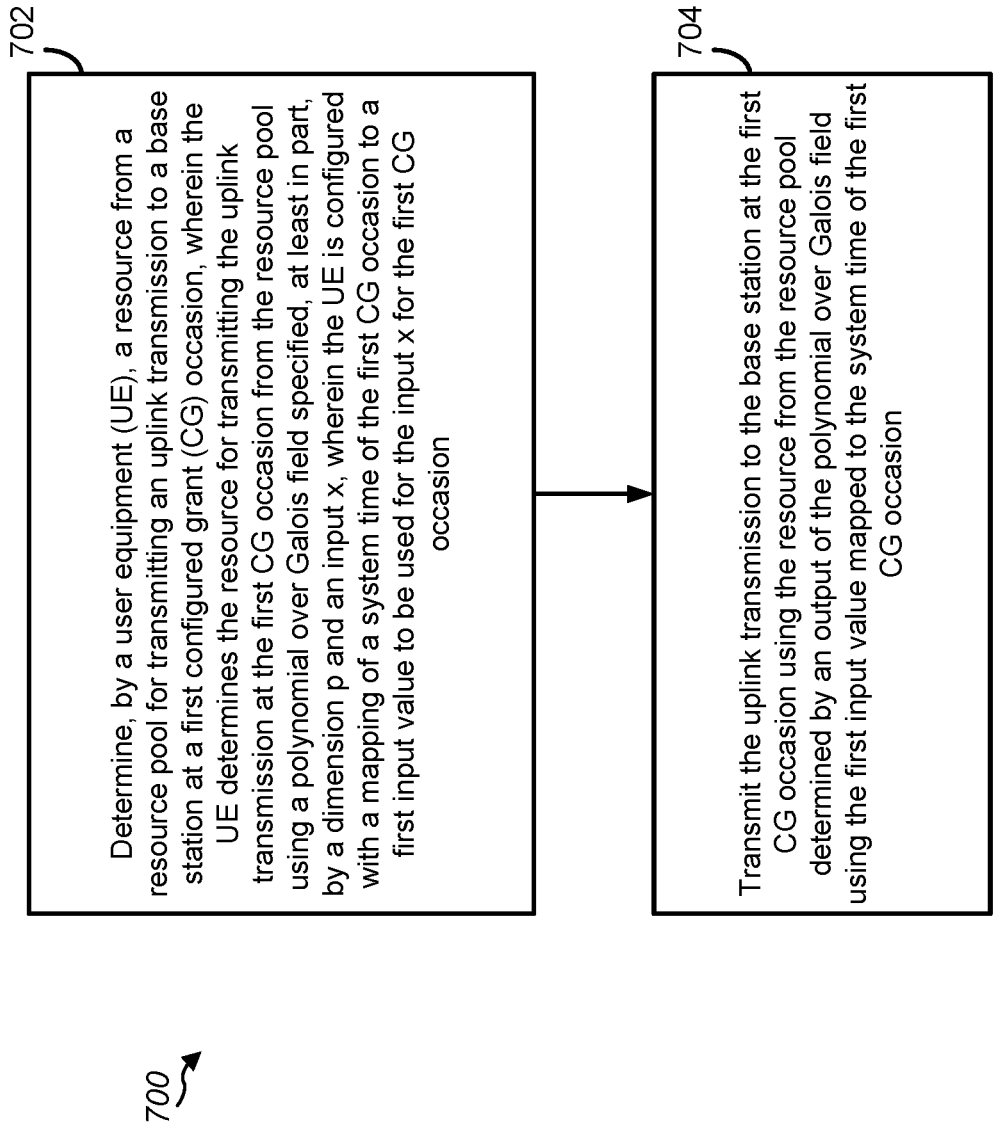
FIG. 7 is a flow diagram illustrating an example process that supports managing allocation of CG resources for uplink transmissions using a polynomial over Galois field in a wireless communication system according to one or more aspects.
Figure 9:
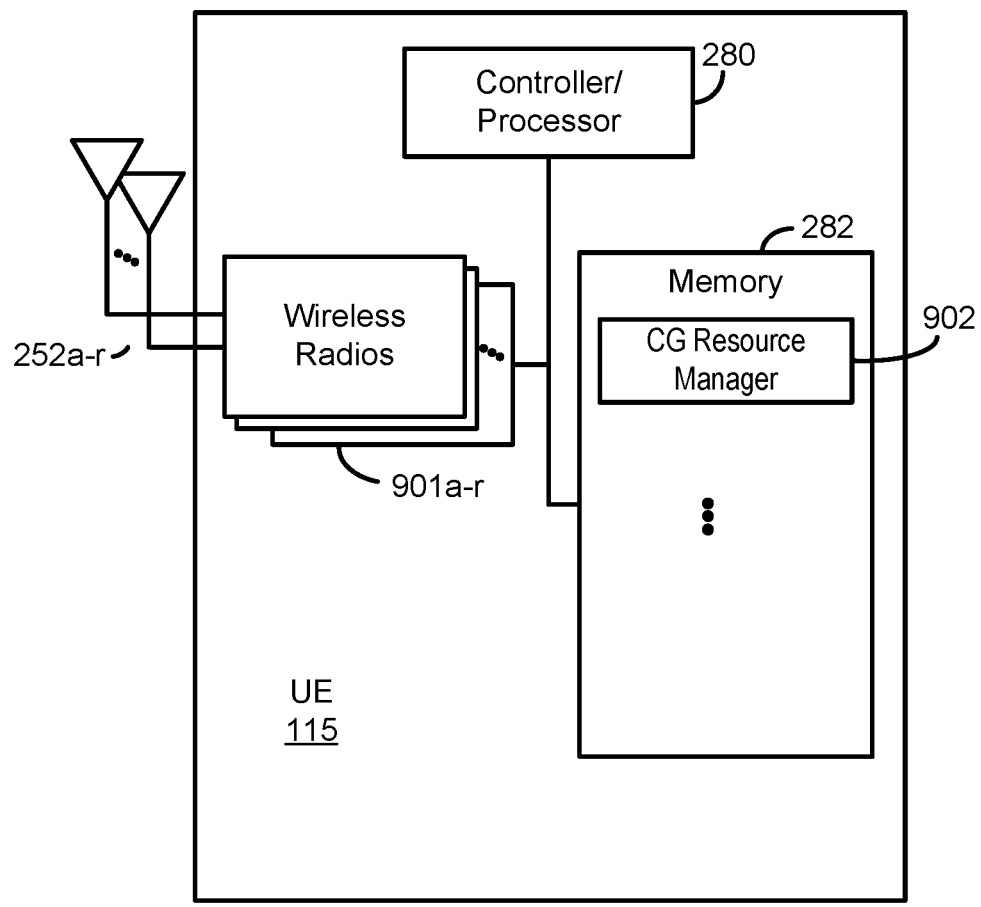
FIG. 9 is a block diagram of an example UE that supports managing allocation of CG resources for uplink transmissions using a polynomial over Galois field in a wireless communication system according to one or more aspects.

FIG. 7 is a flow diagram illustrating an example process 700 that supports managing allocations of CG resources for uplink transmissions using a polynomial over Galois field in a wireless communication system according to one or more aspects. Operations of process 700 may be performed by a UE, such as UE 115 described above with reference to FIGS. 1-6C, or UE 900 described with reference to FIG. 9. For example, example operations (also referred to as "blocks") of process 700 may enable UE 115 to support managing allocations of CG resources for uplink transmissions using a polynomial over Galois field. FIG. 9 is a block diagram illustrating UE 900 configured according to aspects of the present disclosure. UE 900 includes the structure, hardware, and components as illustrated for UE 115 of FIG. 2. For example, UE 900 includes controller/processor 280, which operates to execute logic or computer instructions stored in memory 282, as well as controlling the components of UE 900 that provide the features and functionality of UE 900. UE 900, under control of controller/processor 280, transmits and receives signals via wireless radios 901*a-r* and antennas 252*a-r*. Wireless radios 901*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 702 of process 700, a UE (e.g., UE 900 or UE 115) determines a resource from a resource pool for transmitting an uplink transmission to a base station (e.g., base station 105) at a first CG occasion. In order to implement the functionality for such operations, the UE, under control of controller/processor 280, executes CG resource manager 902, stored in memory 282. The functionality implemented through the execution environment of CG resource manager 902 allows for the UE to perform resource determination operations according to the various aspects herein.

In aspects, UE 115 may determine the resource for transmitting the uplink transmission at the first CG occasion from the resource pool using a polynomial over Galois field specified, at least in part, by a dimension p and an input x. In aspects, UE 115 may be configured with a mapping of a system time of the first CG occasion to a first input value to be used for the input x for the first CG occasion. The mapping of the system time of the first CG occasion to the first input value may include a mapping from absolute system time of the first CG occasion to an index between 0 and p−1. In aspects, resources of the resource pool at the first CG occasion that are not used may be re-allocated, by the base station, to another function different from CG operations.

In aspects, the dimension p may be equal to a size of the resource pool available at the first CG occasion, or may be smaller than the size of the resource pool available at the first CG occasion. In aspects, the output of the polynomial over Galois field using the first input value mapped to the system time of the first CG occasion may indicate an available resource from the resource pool at the first CG occasion.

In some aspects, UE 115 may be configured with a plurality of CG occasions, and UE 115 may determine an available resource for transmitting an uplink transmission at each one of the plurality of CG occasions from a resource pool available at each CG occasion using a corresponding polynomial over Galois field and an input value mapped to each respective one of the of the plurality of CG occasions. The configuration message may be received in a layer 1 control signal.

In aspects, UE 115 may be configured to determine that a CG occasion is disabled or not. For example, UE 115 may be configured to determine that a CG occasion of the plurality of CG occasions is disabled when the CG occasion is mapped to an invalid input value that is an integer greater than the dimension p, or when a size of an available resource pool at the CG occasion is smaller than the dimension p.

In aspects, the resource pool for transmitting the uplink transmission to the base station at the first CG occasion may be a retransmission resource pool of size equal to dimension p associated with the UE and at least one other UE. In these cases, the uplink transmission may represent a retransmission of a previous uplink transmission to the base station. In aspects, UE 115 may be configured to determine another resource of the resource pool available at the first CG occasion based on the output of the polynomial over Galois field using the first input value for the at least one other UE for transmitting a retransmission of a previous uplink transmission from the at least one other UE. In aspects, the first input value may be optimized, by the base station, for the polynomial over Galois field to accommodate concurrent transmission from the UE and the at least one other UE using the retransmission resource pool at the CG occasion. In some aspects, determining the resources for the retransmissions may include using a first polynomial over Galois field for the UE and using a second polynomial over Galois field configured for the at least one other UE.

In aspects, UE 115 may use one or more of multiple polynomials for determining the resource in which to transmit the uplink transmission. For example, UE 115 may use a first polynomial over Galois field to determine the resource for transmitting the uplink transmission, or may use a second polynomial over Galois field to determine the resource for transmitting the uplink transmission, the second polynomial different from the first polynomial. In aspects, UE 115 may be configured to use the first polynomial over Galois field or the second polynomial over Galois field, or use the first polynomial over Galois field as a primary polynomial, and use the second polynomial over Galois field as a secondary polynomial.

In aspects, UE 115 may be configured to define the plurality of resource sub-pools from the resource pool such that each resource sub-pool of the plurality of resource sub-pools has a size value equal to a prime number. In aspects, at least two resource sub-pools of the plurality of resource sub-pools may overlap.

At block 704 of process 700, the UE transmits the uplink transmission to the base station at the first CG occasion using the resource from the resource pool determined by an output of the polynomial over Galois field using the first input value mapped to the system time of the first CG occasion. In order to implement the functionality for such operations, the UE, under control of controller/processor 280, may transmit the uplink transmission to the base station at the first CG occasion using the resource from the resource pool determined by an output of the polynomial over Galois field using the first input value mapped to the system time of the first CG occasion via wireless radios 901*a-r* and antennas 252*a-r*.

In aspects, UE 115 may be configured for sidelink communications with another UE that obtains a channel occupancy time (COT) after listen-before-talk (LBT) procedure. In these cases, the polynomial over Galois field may be indicated by the another UE, and determining, by the UE, the resource may include determining a transmission resource within the COT.

Figure 8:
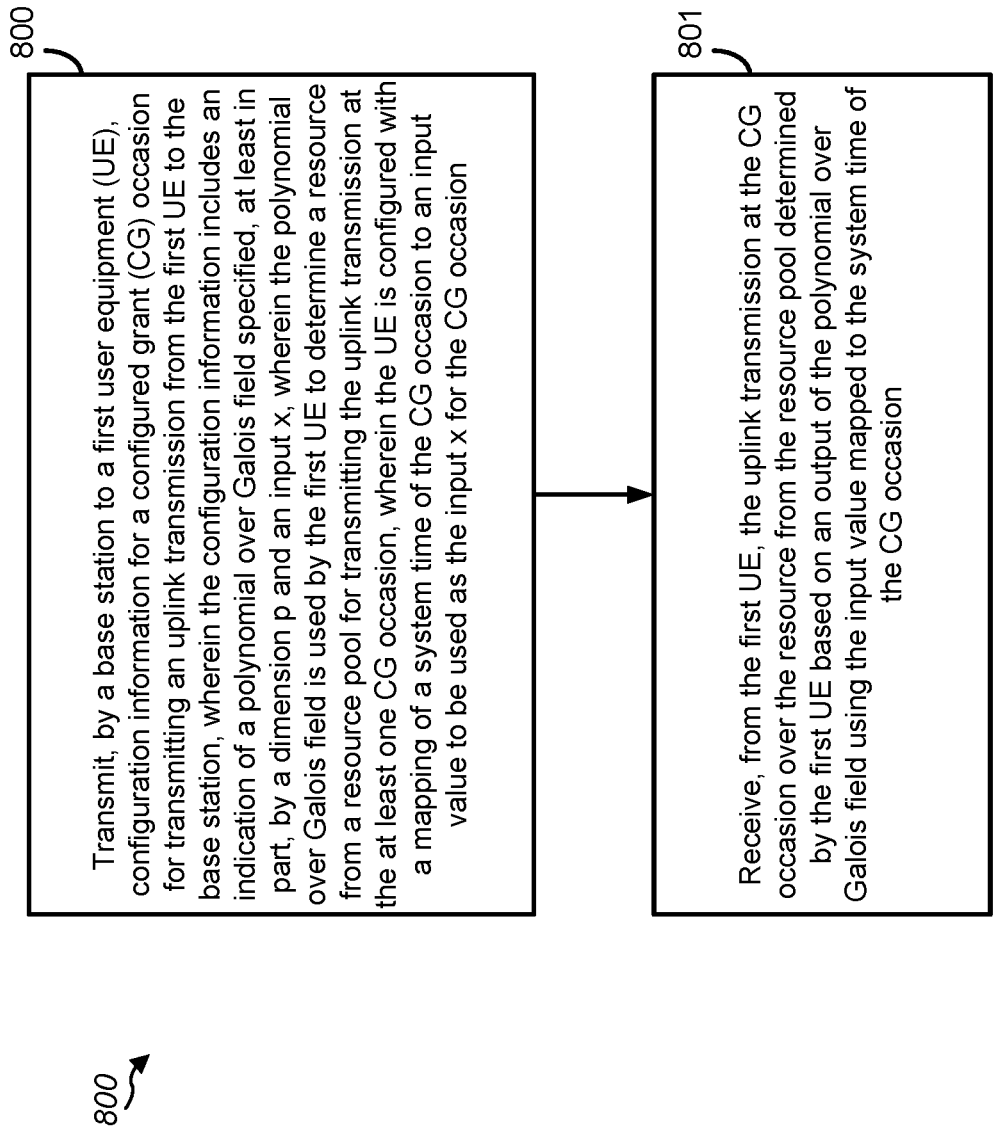
FIG. 8 is a flow diagram illustrating an example process that supports managing allocation of CG resources for uplink transmissions using a polynomial over Galois field in a wireless communication system according to one or more aspects.
Figure 10:
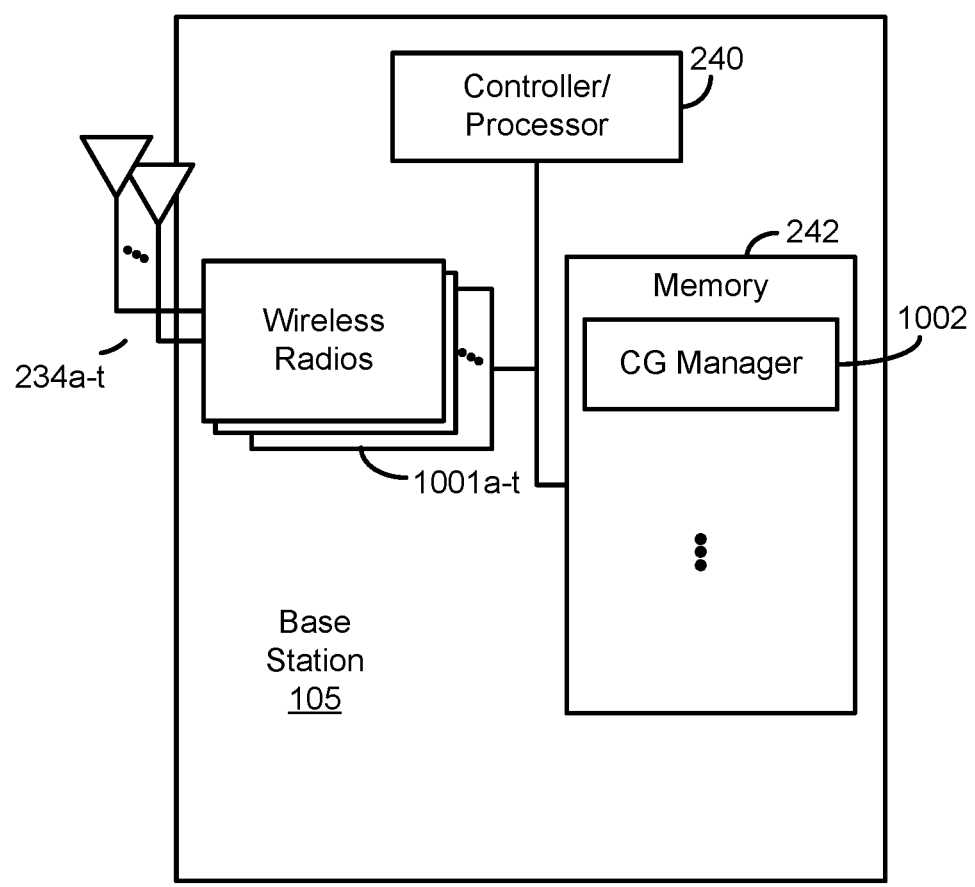
FIG. 10 is a block diagram of an example base station that supports managing allocation of CG resources for uplink transmissions using a polynomial over Galois field in a wireless communication system according to one or more aspects.

FIG. 8 is a block diagram illustrating an example an example process 800 that supports managing allocations of CG resources for uplink transmissions using a polynomial over Galois field in a wireless communication system according to one or more aspects. Operations of process 800 may be performed by a base station, such as base station 105 described above with reference to FIGS. 1-3, or base station 1000 described with reference to FIG. 10. FIG. 10 is a block diagram illustrating base station 1000 configured according to one aspect of the present disclosure. Base station 1000 includes the structure, hardware, and components as illustrated for base station 105 of FIG. 2. For example, base station 1000 includes controller/processor 240, which operates to execute logic or computer instructions stored in memory 242, as well as controlling the components of base station 1000 that provide the features and functionality of base station 1000. Base station 1000, under control of controller/processor 240, transmits and receives signals via wireless radios 1001*a-t* and antennas 234*a-t*. Wireless radios 1001*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 802, a base station (e.g., base station 105 or UE 1000) transmits to a first UE (e.g., UE 115 or UE 900), configuration information for a CG occasion for transmitting an uplink transmission from the first UE to the base station. In order to implement the functionality for such operations, the base station, under control of controller/processor 240, may transmit to a first UE configuration information for a CG occasion for transmitting an uplink transmission from the first UE to the base station via wireless radios 1001*a-r* and antennas 234*a-t*. In aspects, the configuration information may include an indication of a polynomial over Galois field specified, at least in part, by a dimension p and an input x. The polynomial over Galois field may be used by the first UE to determine a resource from a resource pool for transmitting the uplink transmission at the at least one CG occasion.

In aspects, base station 105 may configure UE 115 with a mapping of a system time of the CG occasion to an input value to be used for the input x for the first CG occasion. The mapping of the system time of the CG occasion to the input value may include a mapping from absolute system time of the CG occasion to an index between 0 and p−1. In aspects, resources of the resource pool at the CG occasion that are not used may be re-allocated, by the base station, to another function different from CG operations.

In aspects, the dimension p may be equal to a size of the resource pool available at the CG occasion, or may be smaller than the size of the resource pool available at the CG occasion. In aspects, the output of the polynomial over Galois field using the input value mapped to the system time of the CG occasion may indicate an available resource from the resource pool at the CG occasion.

In some aspects, base station 105 may configure UE 115 with a plurality of CG occasions, and UE 115 may determine an available resource for transmitting an uplink transmission at each one of the plurality of CG occasions from a resource pool available at each CG occasion using a corresponding polynomial over Galois field and an input value mapped to each respective one of the of the plurality of CG occasions.

The configuration message may be transmitted from base station 105 to UE 115 in a layer 1 control signal.

In aspects, base station 105 may configure UE 115 to determine that a CG occasion is disabled or not. For example, base station 105 may configure UE 115 to determine that a CG occasion of the plurality of CG occasions is disabled when the CG occasion is mapped to an invalid input value that is an integer greater than the dimension p, or when a size of an available resource pool at the CG occasion is smaller than the dimension p.

In aspects, the resource pool for transmitting the uplink transmission to the base station at the CG occasion may be a retransmission resource pool of size equal to dimension p associated with the UE and at least one other UE. In these cases, the uplink transmission may represent a retransmission of a previous uplink transmission to the base station. In aspects, base station 105 may configure UE 115 to determine another resource of the resource pool available at the CG occasion based on the output of the polynomial over Galois field using the input value for the at least one other UE for transmitting a retransmission of a previous uplink transmission from the at least one other UE. In aspects, the input value may be optimized, by the base station, for the polynomial over Galois field to accommodate concurrent transmission from the UE and the at least one other UE using the retransmission resource pool at the CG occasion. In some aspects, determining the resources for the retransmissions may include using a first polynomial over Galois field for the UE and using a second polynomial over Galois field configured for the at least one other UE.

In aspects, base station 105 may configure UE 115 to use one or more of multiple polynomials for determining the resource in which to transmit the uplink transmission. For example, base station 105 may configure UE 115 to use a first polynomial over Galois field to determine the resource for transmitting the uplink transmission, or to use a second polynomial over Galois field to determine the resource for transmitting the uplink transmission, the second polynomial different from the first polynomial. In aspects, base station 105 may configure UE 115 to use the first polynomial over Galois field or the second polynomial over Galois field, or to use the first polynomial over Galois field as a primary polynomial and the second polynomial over Galois field as a secondary polynomial.

In aspects, base station 105 may configure UE 115 to define the plurality of resource sub-pools from the resource pool such that each resource sub-pool of the plurality of resource sub-pools has a size value equal to a prime number. In aspects, at least two resource sub-pools of the plurality of resource sub-pools may overlap.

At block 804, base station 105 receives the uplink transmission at the CG occasion over the resource from the resource pool determined by the first UE based on an output of the polynomial over Galois field using the input value mapped to the system time of the CG occasion. In order to implement the functionality for such operations, the base station, under control of controller/processor 240, may receive the uplink transmission to the base station at the first CG occasion using the resource from the resource pool determined by an output of the polynomial over Galois field using the first input value mapped to the system time of the first CG occasion via wireless radios 1001a-r and antennas 234a-t.

In one or more aspects, techniques for supporting managing allocations of CG resources for uplink transmissions using a polynomial over Galois field in a wireless communication system according to one or more aspects may include additional aspects, such as any single aspect or any combination of aspects described below or in connection with one or more other processes or devices described elsewhere herein. In a first aspect, supporting managing allocations of CG resources for uplink transmissions using a polynomial over Galois field in a wireless communication system may include an apparatus configured to determine a resource from a resource pool for transmitting an uplink transmission to a base station at a first CG occasion. In this aspect, the UE determines the resource for transmitting the uplink transmission at the first CG occasion from the resource pool using a polynomial over Galois field specified, at least in part, by a dimension p and an input x, wherein the UE is configured with a mapping of a system time of the first CG occasion to a first input value to be used as the input x for the first CG occasion. The apparatus is further configured to transmit the uplink transmission to the base station at the first CG occasion using the resource from the resource pool determined by an output of the polynomial over Galois field using the first input value mapped to the system time of the first CG occasion. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the mapping of the system time of the first CG occasion to the first input value includes a mapping from absolute system time of the first CG occasion to an index between 0 and p−1.

In a third aspect, alone or in combination with one or more of the first aspect or the second aspect, the output of the polynomial over Galois field using the first input value mapped to the system time of the first CG occasion indicates an available resource from the resource pool at the first CG occasion.

In a fourth aspect, alone or in combination with one or more of the first aspect through the third aspect, the dimension p is equal to a size of the resource pool available at the first CG occasion.

In a fifth aspect, alone or in combination with the fourth aspect, the dimension p is smaller than the size of the resource pool available at the first CG occasion.

In a sixth aspect, alone or in combination with one or more of the first aspect through the fifth aspect, the UE is configured with a plurality of CG occasions.

In a seventh aspect, alone or in combination with one or more of the first aspect through the sixth aspect, the UE determines an available resource for transmitting an uplink transmission at each one of the plurality of CG occasions from a resource pool available at each CG occasion using a corresponding polynomial over Galois field and an input value mapped to each respective one of the of the plurality of CG occasions.

In an eighth aspect, alone or in combination with one or more of the first aspect through the seventh aspect, the techniques of the first aspect may include receiving, from the base station, a configuration message including, for each one of the plurality of CG occasions, an indication of the corresponding polynomial over Galois field.

In a ninth aspect, alone or in combination with the eighth aspect, the indication is an index to a hard-coded table of predefined polynomials over Galois field.

In a tenth aspect, alone or in combination with one or more of the first aspect through the ninth aspect, the configuration message is received in a layer 1 control signal.

In an eleventh aspect, alone or in combination with one or more of the first aspect through the tenth aspect, the techniques of the first aspect may include determining that a CG occasion of the plurality of CG occasions is disabled when the CG occasion is mapped to an invalid input value that is an integer greater than the dimension p.

In a twelfth aspect, alone or in combination with the eleventh aspect, the techniques of the first aspect may include determining that a CG occasion of the plurality of CG occasions is disabled when a size of an available resource pool at the CG occasion is smaller than the dimension p.

In a thirteenth aspect, alone or in combination with one or more of the first aspect through the twelfth aspect, the resource pool for transmitting the uplink transmission to the base station at the first CG occasion is a retransmission resource pool of size equal to dimension p associated with the UE and at least one other UE, and the uplink transmission is a retransmission of a previous uplink transmission to the base station.

In a fourteenth aspect, alone or in combination with the thirteenth aspect, another resource of the resource pool available at the first CG occasion is determined by the output of the polynomial over Galois field using the first input value for the at least one other UE for transmitting a retransmission of a previous uplink transmission from the at least one other UE.

In a fifteenth aspect, alone or in combination with one or more of the first aspect through the fourteenth aspect, the first input value is optimized, by the base station, for the polynomial over Galois field to accommodate concurrent transmission from the UE and the at least one other UE using the retransmission resource pool at the CG occasion.

In a sixteenth aspect, alone or in combination with one or more of the first aspect through the fifteenth aspect, a first polynomial over Galois field is configured for the UE and a second polynomial over Galois field is configured for the at least one other UE.

In a seventeenth aspect, alone or in combination with one or more of the first aspect through the sixteenth aspect, using the polynomial over Galois field by the UE includes using a first polynomial over Galois field to determine the resource for transmitting the uplink transmission.

In an eighteenth aspect, alone or in combination with the seventeenth aspect, using the polynomial over Galois field by the UE includes using a second polynomial over Galois field to determine the resource for transmitting the uplink transmission, the second polynomial different from the first polynomial.

In a nineteenth aspect, alone or in combination with one or more of the first aspect through the eighteenth aspect, wherein the UE is configured to use the first polynomial over Galois field or the second polynomial over Galois field.

In a twentieth aspect, alone or in combination with the nineteenth aspect, wherein the UE is configured to use the first polynomial over Galois field as a primary polynomial, and use the second polynomial over Galois field as a secondary polynomial.

In a twenty-first aspect, alone or in combination with one or more of the first aspect through the twentieth aspect, the resource pool at the first CG occasion includes a plurality of resource sub-pools.

In a twenty-second aspect, alone or in combination with the twenty-first aspect, the mapping of the system time of the first CG occasion to a first input value includes a mapping of the system time of the first CG occasion to a plurality of input values, each input value of the plurality of input values corresponding to one resource sub-pool of the plurality of resource sub-pools.

In a twenty-third aspect, alone or in combination with one or more of the twenty-first aspect trough the twenty-second aspect, the UE determines an available resource at each resource sub-pool of the plurality of resource sub-pools using the polynomial over Galois field and a respective input value of the plurality of input values.

In a twenty-fourth aspect, alone or in combination with one or more of the first aspect through the twenty-third aspect, the UE is configured to define the plurality of resource sub-pools from the resource pool such that each resource sub-pool of the plurality of resource sub-pools has a size value equal to a prime number.

In a twenty-fifth aspect, alone or in combination with one or more of the first aspect through the twenty-fourth aspect, at least two resource sub-pools of the plurality of resource sub-pools overlap.

In a twenty-sixth aspect, alone or in combination with one or more of the first aspect through the twenty-fifth aspect, resources of the resource pool at the first CG occasion that are not used are re-allocated, by the base station, to another function different from CG operations.

In a twenty-seventh aspect, alone or in combination with one or more of the first aspect through the twenty-sixth aspect, the UE is configured for sidelink communications with another UE that obtains a COT after an LBT procedure.

In a twenty-eighth aspect, alone or in combination with the twenty-seventh aspect, the polynomial over Galois field is indicated by the another.

In a twenty-ninth aspect, alone or in combination with one or more of the twenty-seventh aspect through the twenty-eighth aspect, determining, by the UE, the resource includes determining a transmission resource within the COT.

In a thirtieth aspect, supporting managing allocations of CG resources for uplink transmissions using a polynomial over Galois field in a wireless communication system may include an apparatus configured to transmit, from a base station to a first UE, configuration information for a CG occasion for transmitting an uplink transmission from the first UE to the base station. In this aspect, the configuration information includes an indication of a polynomial over Galois field specified, at least in part, by a dimension p and an input x, the polynomial over Galois field is used by the first UE to determine a resource from a resource pool for transmitting the uplink transmission at the at least one CG occasion, and the UE is configured with a mapping of a system time of the CG occasion to an input value to be used as the input x for the CG occasion. The apparatus is further configured to receive, from the first UE, the uplink transmission at the CG occasion over the resource from the resource pool determined by the first UE based on an output of the polynomial over Galois field using the input value mapped to the system time of the CG occasion. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-first aspect, alone or in combination with one or more of the first aspect through the thirtieth aspect, the dimension p is equal to a size of the resource pool available at the CG occasion.

In a thirty-second aspect, alone or in combination with the thirty-first aspect, the dimension p is smaller than the size of the resource pool available at the CG occasion.

In a thirty-third aspect, alone or in combination with one or more of the first aspect through the thirty-second aspect, the configuration information for the CG occasion includes configuration information for a plurality of CG occasions and an indication of a corresponding polynomial over Galois field for determining an available resource for transmitting an uplink transmission at each one of the plurality of CG occasions from a resource pool available at each CG occasion using the corresponding polynomial over Galois field and an input value mapped to each respective one of the of the plurality of CG occasions.

In a thirty-fourth aspect, alone or in combination with one or more of the first aspect through the thirty-fourth aspect, the configuration information includes, for each one of the plurality of CG occasions, an indication of the corresponding polynomial over Galois field.

In a thirty-fifth aspect, alone or in combination with the thirty-third aspect, the indication is an index to a hard-coded table of predefined polynomials over Galois field.

In a thirty-sixth aspect, alone or in combination with one or more of the first aspect through the thirty-fifth aspect, the configuration message is transmitted by the base station to the first UE in a layer 1 control signal.

In a thirty-seventh aspect, alone or in combination with one or more of the first aspect through the thirty-sixth aspect, a first CG occasion of the plurality of CG occasions is determined to be disabled when the first CG occasion is mapped to an invalid input value that is an integer greater than the dimension p.

In a thirty-eighth aspect, alone or in combination with the thirty-seventh aspect, the first CG occasion of the plurality of CG occasions is determined to be disabled when a size of an available resource pool at the CG occasion is smaller than the dimension p.

In a thirty-ninth aspect, alone or in combination with one or more of the first aspect through the thirty-eighth aspect, the resource pool for transmitting the uplink transmission to the base station at the CG occasion is a retransmission resource pool of size equal to dimension p associated with the first UE and at least one other UE, and the uplink transmission is a retransmission of a previous uplink transmission to the base station.

In a fortieth aspect, alone or in combination with the thirty-ninth aspect, another resource of the resource pool available at the first CG occasion is determined by the output of the polynomial over Galois field using the input value for the at least one other UE for transmitting a retransmission of a previous uplink transmission from the at least one other UE.

In a forty-first aspect, alone or in combination with one or more of the first aspect through the fortieth aspect, the techniques of the thirtieth aspect include optimizing, by the base station, the input value for the polynomial over Galois field to accommodate concurrent transmission from the first UE and the at least one other UE using the retransmission resource pool at the CG occasion.

In a forty-second aspect, alone or in combination with one or more of the first aspect through the forty-first aspect, a first polynomial over Galois field is configured for the first UE and a second polynomial over Galois field is configured for the at least one other UE.

In a forty-third aspect, alone or in combination with one or more of the first aspect through the forty-second aspect, the indication of the polynomial over Galois field includes an indication of a plurality polynomials over Galois field.

In a forty-fourth aspect, alone or in combination with the forty-third aspect, the first UE uses the polynomial over Galois field by using a first polynomial over Galois field of the plurality polynomials over Galois field to determine the resource for transmitting the uplink transmission to the base station.

In a forty-fifth aspect, alone or in combination with one or more of the forty-third aspect through the forty-fourth aspect, the first UE uses the polynomial over Galois field by using a second polynomial over Galois field of the plurality polynomials over Galois field to determine the resource for transmitting the uplink transmission to the base station, the second polynomial different from the first polynomial.

In a forty-sixth aspect, alone or in combination with one or more of the first aspect through the forty-fifth aspect, the resource pool at the CG occasion includes a plurality of resource sub-pools.

In a forty-seventh aspect, alone or in combination with the forty-sixth aspect, the mapping of the system time of the CG occasion to the input value includes a mapping of the system time of the CG occasion to a plurality of input values, each input value of the plurality of input values corresponding to one resource sub-pool of the plurality of resource sub-pools.

In a forty-eighth aspect, alone or in combination with one or more of the forty-sixth aspect through the forty-seventh aspect, the UE determines an available resource at each resource sub-pool of the plurality of resource sub-pools using the polynomial over Galois field and a respective input value of the plurality of input values.

In a forty-ninth aspect, alone or in combination with one or more of the first aspect through the forty-eighth aspect, resources of the resource pool at the first CG occasion that are not used are re-allocated, by the base station, to another function different from CG operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 1-10 may comprise processors, electronics devices, hardware devices, electronics components, logical circuits, memories, software codes, firmware codes, etc., or any combination thereof.

Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    determining, by a user equipment (UE), a resource from a resource pool for transmitting an uplink transmission to a base station at a first configured grant (CG) occasion, wherein the UE determines the resource for transmitting the uplink transmission at the first CG occasion from the resource pool using a polynomial over Galois field specified, at least in part, by a dimension p and an input x, wherein the UE is configured with a mapping of a system time of the first CG occasion to a first input value to be used as the input x for the first CG occasion; and
    transmitting the uplink transmission to the base station at the first CG occasion using the resource from the resource pool determined by an output of the polynomial over Galois field using the first input value mapped to the system time of the first CG occasion.

2. The method of claim 1, wherein the mapping of the system time of the first CG occasion to the first input value includes a mapping from absolute system time of the first CG occasion to an index between 0 and p−1.

3. The method of claim 1, wherein the output of the polynomial over Galois field using the first input value mapped to the system time of the first CG occasion indicates an available resource from the resource pool at the first CG occasion.

4. The method of claim 1, wherein the dimension p is one of:
equal to a size of the resource pool available at the first CG occasion; or
smaller than the size of the resource pool available at the first CG occasion.

5. The method of claim 1, wherein the UE is configured with a plurality of CG occasions, and wherein the UE determines an available resource for transmitting an uplink transmission at each one of the plurality of CG occasions from a resource pool available at each CG occasion using a corresponding polynomial over Galois field and an input value mapped to each respective one of the of the plurality of CG occasions.

6. The method of claim 5, further comprising:
receiving, from the base station, a configuration message including, for each one of the plurality of CG occasions, an indication of the corresponding polynomial over Galois field, wherein the indication is an index to a hard-coded table of predefined polynomials over Galois field.

7. The method of claim 6, wherein the configuration message is received in a layer 1 control signal.

8. The method of claim 5, further comprising:
determining that a CG occasion of the plurality of CG occasions is disabled when one of:
the CG occasion is mapped to an invalid input value that is an integer greater than the dimension p; or
a size of an available resource pool at the CG occasion is smaller than the dimension p.

9. The method of claim 1, wherein the resource pool for transmitting the uplink transmission to the base station at the first CG occasion is a retransmission resource pool of size equal to dimension p associated with the UE and at least one other UE, and the uplink transmission is a retransmission of a previous uplink transmission to the base station, and wherein another resource of the resource pool available at the first CG occasion is determined by the output of the polynomial over Galois field using the first input value for the at least one other UE for transmitting a retransmission of a previous uplink transmission from the at least one other UE.

10. The method of claim 9, wherein the first input value is optimized, by the base station, for the polynomial over Galois field to accommodate concurrent transmission from the UE and the at least one other UE using the retransmission resource pool at the CG occasion.

11. The method of claim 9, wherein a first polynomial over Galois field is configured for the UE and a second polynomial over Galois field is configured for the at least one other UE.

12. The method of claim 1, wherein using the polynomial over Galois field by the UE includes one of:
using a first polynomial over Galois field to determine the resource for transmitting the uplink transmission; or
using a second polynomial over Galois field to determine the resource for transmitting the uplink transmission, the second polynomial different from the first polynomial.

13. The method of claim 12, wherein the UE is configured to one of:
use the first polynomial over Galois field or the second polynomial over Galois field; or
use the first polynomial over Galois field as a primary polynomial, and use the second polynomial over Galois field as a secondary polynomial.

14. The method of claim 1, wherein the resource pool at the first CG occasion includes a plurality of resource sub-pools, wherein the mapping of the system time of the first CG occasion to a first input value includes a mapping of the system time of the first CG occasion to a plurality of input values, each input value of the plurality of input values corresponding to one resource sub-pool of the plurality of resource sub-pools, and wherein the UE determines an available resource at each resource sub-pool of the plurality of resource sub-pools using the polynomial over Galois field and a respective input value of the plurality of input values.

15. The method of claim 14, wherein the UE is configured to define the plurality of resource sub-pools from the resource pool such that each resource sub-pool of the plurality of resource sub-pools has a size value equal to a prime number.

16. The method of claim 15, wherein at least two resource sub-pools of the plurality of resource sub-pools overlap.

17. The method of claim 1, wherein resources of the resource pool at the first CG occasion that are not used are re-allocated, by the base station, to another function different from CG operations.

18. The method of claim 1, wherein the UE is configured for sidelink communications with another UE that obtains a channel occupancy time (COT) after listen-before-talk (LBT) procedure, wherein the polynomial over Galois field is indicated by the another UE, and wherein determining, by the UE, the resource includes determining a transmission resource within the COT.

19. A method of wireless communication, the method comprising:
transmitting, by a base station to a first user equipment (UE), configuration information for a configured grant (CG) occasion for transmitting an uplink transmission from the first UE to the base station, wherein the configuration information includes an indication of a polynomial over Galois field specified, at least in part, by a dimension p and an input x, wherein the polynomial over Galois field is used by the first UE to determine a resource from a resource pool for transmitting the uplink transmission at the at least one CG occasion, wherein the UE is configured with a mapping of a system time of the CG occasion to an input value to be used as the input x for the CG occasion; and
receiving, from the first UE, the uplink transmission at the CG occasion over the resource from the resource pool determined by the first UE based on an output of the polynomial over Galois field using the input value mapped to the system time of the CG occasion.

20. The method of claim 19, wherein the dimension p is one of:
equal to a size of the resource pool available at the CG occasion; or
smaller than the size of the resource pool available at the CG occasion.

21. The method of claim 19, wherein the configuration information for the CG occasion includes configuration information for a plurality of CG occasions and an indication of a corresponding polynomial over Galois field for determining an available resource for transmitting an uplink transmission at each one of the plurality of CG occasions from a resource pool available at each CG occasion using the corresponding polynomial over Galois field and an input value mapped to each respective one of the of the plurality of CG occasions.

22. The method of claim 21, wherein the configuration information includes, for each one of the plurality of CG occasions, an indication of the corresponding polynomial over Galois field, wherein the indication is an index to a hard-coded table of predefined polynomials over Galois field.

23. The method of claim 22, wherein the configuration message is transmitted by the base station to the first UE in a layer 1 control signal.

24. The method of claim 21, wherein a first CG occasion of the plurality of CG occasions is determined to be disabled when one of:
the first CG occasion is mapped to an invalid input value that is an integer greater than the dimension p; or
a size of an available resource pool at the CG occasion is smaller than the dimension p.

25. The method of claim 19, wherein the resource pool for transmitting the uplink transmission to the base station at the CG occasion is a retransmission resource pool of size equal to dimension p associated with the first UE and at least one other UE, and the uplink transmission is a retransmission of a previous uplink transmission to the base station, and wherein another resource of the resource pool available at the first CG occasion is determined by the output of the polynomial over Galois field using the input value for the at least one other UE for transmitting a retransmission of a previous uplink transmission from the at least one other UE.

26. The method of claim 25, further comprising:
optimizing, by the base station, the input value for the polynomial over Galois field to accommodate concurrent transmission from the first UE and the at least one other UE using the retransmission resource pool at the CG occasion.

27. The method of claim 25, wherein a first polynomial over Galois field is configured for the first UE and a second polynomial over Galois field is configured for the at least one other UE.

28. The method of claim 19, wherein the indication of the polynomial over Galois field includes an indication of a plurality polynomials over Galois field, and wherein the first UE uses the polynomial over Galois field by one of:
using a first polynomial over Galois field of the plurality polynomials over Galois field to determine the resource for transmitting the uplink transmission to the base station; or
using a second polynomial over Galois field of the plurality polynomials over Galois field to determine the resource for transmitting the uplink transmission to the base station, the second polynomial different from the first polynomial.

29. The method of claim 19, wherein the resource pool at the CG occasion includes a plurality of resource sub-pools, wherein the mapping of the system time of the CG occasion to the input value includes a mapping of the system time of the CG occasion to a plurality of input values, each input value of the plurality of input values corresponding to one resource sub-pool of the plurality of resource sub-pools, and wherein the UE determines an available resource at each resource sub-pool of the plurality of resource sub-pools using the polynomial over Galois field and a respective input value of the plurality of input values.

30. The method of claim 19, wherein resources of the resource pool at the first CG occasion that are not used are re-allocated, by the base station, to another function different from CG operations.

* * * * *